US 8,049,951 B2

(12) United States Patent
Gruhlke et al.

(10) Patent No.: US 8,049,951 B2
(45) Date of Patent: Nov. 1, 2011

(54) LIGHT WITH BI-DIRECTIONAL PROPAGATION

(75) Inventors: Russell Wayne Gruhlke, Milpitas, CA (US); Marek Mienko, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 243 days.

(21) Appl. No.: 12/423,354

(22) Filed: Apr. 14, 2009

(65) Prior Publication Data

US 2009/0257108 A1 Oct. 15, 2009

Related U.S. Application Data

(60) Provisional application No. 61/045,250, filed on Apr. 15, 2008.

(51) Int. Cl.
*G02B 26/00* (2006.01)
*G09F 13/08* (2006.01)
*F21V 7/04* (2006.01)

(52) U.S. Cl. .................. 359/290; 362/97.1; 362/609

(58) Field of Classification Search ............... 359/212.1, 359/223.1, 247, 290–292, 302; 362/97.1, 362/606–609
See application file for complete search history.

(56) References Cited

U.S. PATENT DOCUMENTS

| | | | |
|---|---|---|---|
| 3,439,973 A | 4/1969 | Paul et al. | |
| 3,886,310 A | 5/1975 | Guldberg | |
| 3,924,929 A | 12/1975 | Holmen | |
| 4,154,219 A | 5/1979 | Gupta et al. | |
| 4,228,437 A | 10/1980 | Shelton | |
| 4,375,312 A | 3/1983 | Tangonan | |
| 4,378,567 A | 3/1983 | Mir | |
| 4,421,381 A | 12/1983 | Ueda | |
| 4,441,791 A | 4/1984 | Hornbeck | |
| 4,850,682 A | 7/1989 | Gerritsen | |
| 4,863,224 A | 9/1989 | Afian | |
| 4,918,577 A | 4/1990 | Furudate | |
| 4,974,942 A | 12/1990 | Gross et al. | |
| 5,050,946 A | 9/1991 | Hathaway | |
| 5,110,370 A | 5/1992 | Vogeli et al. | |
| 5,123,247 A | 6/1992 | Nelson | |
| 5,142,414 A | 8/1992 | Koehler | |
| 5,151,585 A | 9/1992 | Seibert | |
| 5,151,801 A | 9/1992 | Hiroshima | |
| 5,226,099 A | 7/1993 | Mignardi et al. | |
| 5,261,970 A | 11/1993 | Landis et al. | |
| 5,291,314 A | 3/1994 | Agranat | |

(Continued)

FOREIGN PATENT DOCUMENTS

CN 1272922 11/2000

(Continued)

OTHER PUBLICATIONS

Official Communication in Japanese Application No. 2007-533487, dated Sep. 7, 2010.

(Continued)

*Primary Examiner* — William Choi
(74) *Attorney, Agent, or Firm* — Knobbe, Martens, Olson & Bear LLP

(57) ABSTRACT

Devices for providing illumination to a display and method for manufacturing the same. In one embodiment, a display device includes a reflective display and turning features for turning light propagating from opposite directions in a light guide to the reflective display.

35 Claims, 13 Drawing Sheets

U.S. PATENT DOCUMENTS

| | | |
|---|---|---|
| 5,339,179 A | 8/1994 | Rudisill |
| 5,398,125 A | 3/1995 | Willett |
| 5,448,659 A | 9/1995 | Tsutsui et al. |
| 5,452,385 A | 9/1995 | Izumi |
| 5,459,610 A | 10/1995 | Bloom |
| 5,467,417 A | 11/1995 | Nakamura |
| 5,481,385 A | 1/1996 | Zimmerman et al. |
| 5,515,184 A | 5/1996 | Caulfield |
| 5,550,373 A | 8/1996 | Cole |
| 5,555,160 A | 9/1996 | Tawara |
| 5,579,149 A | 11/1996 | Moret |
| 5,592,332 A | 1/1997 | Nishio |
| 5,594,830 A | 1/1997 | Winston |
| 5,615,024 A | 3/1997 | May et al. |
| 5,647,036 A | 7/1997 | Deacon et al. |
| 5,650,865 A | 7/1997 | Smith |
| 5,659,410 A | 8/1997 | Koike |
| 5,671,314 A | 9/1997 | Gregory et al. |
| 5,671,994 A | 9/1997 | Tai |
| 5,673,128 A | 9/1997 | Ohta et al. |
| 5,703,667 A | 12/1997 | Ochiai |
| 5,712,694 A | 1/1998 | Taira et al. |
| 5,731,857 A | 3/1998 | Neijzen |
| 5,735,590 A | 4/1998 | Kashima |
| 5,771,124 A | 6/1998 | Kintz |
| 5,771,321 A | 6/1998 | Stern |
| 5,782,993 A | 7/1998 | Ponewash |
| 5,783,614 A | 7/1998 | Chen |
| 5,805,117 A | 9/1998 | Mazurek |
| 5,808,708 A | 9/1998 | Oyama et al. |
| 5,810,464 A | 9/1998 | Ishikawa |
| 5,815,229 A | 9/1998 | Shapiro |
| 5,854,872 A | 12/1998 | Tai |
| 5,883,684 A | 3/1999 | Milikan et al. |
| 5,892,598 A | 4/1999 | Asakawa et al. |
| 5,913,594 A | 6/1999 | Iimura |
| 5,914,804 A | 6/1999 | Goossen |
| 5,920,417 A | 7/1999 | Johnson |
| 5,933,183 A | 8/1999 | Enomoto |
| 5,956,106 A | 9/1999 | Petersen |
| 5,961,198 A | 10/1999 | Hira |
| 5,982,540 A | 11/1999 | Koike |
| 5,991,073 A | 11/1999 | Woodgate et al. |
| 5,999,239 A | 12/1999 | Larson |
| 6,002,829 A | 12/1999 | Winston |
| 6,008,449 A | 12/1999 | Cole |
| 6,014,192 A | 1/2000 | Lehureau |
| 6,040,937 A | 3/2000 | Miles |
| 6,048,071 A | 4/2000 | Sawayama |
| 6,055,090 A | 4/2000 | Miles |
| 6,068,382 A | 5/2000 | Fukui |
| 6,072,620 A | 6/2000 | Shiono |
| 6,073,034 A | 6/2000 | Jacobsen |
| 6,074,069 A | 6/2000 | Chao-Ching |
| 6,091,469 A | 7/2000 | Naito |
| 6,099,134 A | 8/2000 | Taniguchi |
| 6,123,431 A | 9/2000 | Teragaki |
| 6,128,077 A | 10/2000 | Jovin |
| 6,151,089 A | 11/2000 | Yang et al. |
| 6,195,196 B1 | 2/2001 | Kimura |
| 6,196,691 B1 | 3/2001 | Ochiai |
| 6,199,989 B1 | 3/2001 | Maeda et al. |
| 6,232,937 B1 | 5/2001 | Jacobsen |
| 6,243,149 B1 | 6/2001 | Swanson et al. |
| 6,259,082 B1 | 7/2001 | Fujimoto et al. |
| 6,259,854 B1 | 7/2001 | Shinji et al. |
| 6,273,577 B1 | 8/2001 | Goto et al. |
| 6,282,010 B1 | 8/2001 | Sulzbach |
| 6,292,504 B1 | 9/2001 | Halmos |
| 6,322,901 B1 | 11/2001 | Bawendi |
| 6,323,415 B1 | 11/2001 | Uematsu et al. |
| 6,323,892 B1 | 11/2001 | Mihara |
| 6,323,987 B1 | 11/2001 | Rinaudo |
| 6,359,668 B1 | 3/2002 | Iijima |
| 6,371,623 B1 | 4/2002 | Toyoda |
| 6,377,233 B2 | 4/2002 | Colgan |
| 6,377,535 B1 | 4/2002 | Chen et al. |
| 6,381,022 B1 | 4/2002 | Zavracky |
| 6,407,785 B1 | 6/2002 | Yamazaki |
| 6,412,969 B1 | 7/2002 | Torihara |
| 6,454,452 B1 | 9/2002 | Sasagawa |
| 6,456,279 B1 | 9/2002 | Kubo |
| 6,478,432 B1 | 11/2002 | Dyner |
| 6,483,613 B1 | 11/2002 | Woodgate et al. |
| 6,493,475 B1 | 12/2002 | Lin |
| 6,504,589 B1 | 1/2003 | Kashima |
| 6,512,626 B1 | 1/2003 | Schmidt |
| 6,519,073 B1 | 2/2003 | Goossen |
| 6,522,794 B1 | 2/2003 | Bischel et al. |
| 6,538,813 B1 | 3/2003 | Magno |
| 6,574,033 B1 | 6/2003 | Chui |
| 6,577,429 B1 | 6/2003 | Kurtz |
| 6,582,095 B1 | 6/2003 | Toyoda |
| 6,592,234 B2 | 7/2003 | Epstein |
| 6,597,490 B2 | 7/2003 | Tayebati |
| 6,598,987 B1 | 7/2003 | Parikka |
| 6,603,520 B2 | 8/2003 | Umemoto |
| 6,631,998 B2 | 10/2003 | Egawa et al. |
| 6,636,322 B1 | 10/2003 | Terashita |
| 6,636,358 B2 | 10/2003 | Umemoto et al. |
| 6,640,675 B1 | 11/2003 | Chuang et al. |
| 6,642,913 B1 | 11/2003 | Kimura |
| 6,643,067 B2 | 11/2003 | Miyamae |
| 6,646,772 B1 | 11/2003 | Popovich et al. |
| 6,650,455 B2 | 11/2003 | Miles |
| 6,652,109 B2 | 11/2003 | Nakamura |
| 6,657,683 B2 | 12/2003 | Richard |
| 6,657,700 B2 | 12/2003 | Sako et al. |
| 6,660,997 B2 | 12/2003 | Laberge |
| 6,667,782 B1 | 12/2003 | Taira et al. |
| 6,669,350 B2 | 12/2003 | Yamashita |
| 6,674,562 B1 | 1/2004 | Miles |
| 6,680,792 B2 | 1/2004 | Miles |
| 6,683,693 B1 | 1/2004 | O'Tsuka |
| 6,693,690 B2 | 2/2004 | Umemoto |
| 6,697,403 B2 | 2/2004 | Lee et al. |
| 6,709,123 B2 | 3/2004 | Flohr |
| 6,738,194 B1 | 5/2004 | Ramirez |
| 6,741,377 B2 | 5/2004 | Miles |
| 6,742,907 B2 | 6/2004 | Funamoto et al. |
| 6,742,921 B2 | 6/2004 | Umemoto |
| 6,747,801 B2 | 6/2004 | Umemoto |
| 6,751,023 B2 | 6/2004 | Umemoto et al. |
| 6,760,135 B1 | 7/2004 | Payne |
| 6,761,461 B2 | 7/2004 | Mizutani et al. |
| 6,773,126 B1 | 8/2004 | Hatjasalo |
| 6,778,746 B2 | 8/2004 | Charlton |
| 6,784,948 B2 | 8/2004 | Kawashima et al. |
| 6,792,293 B1 | 9/2004 | Awan et al. |
| 6,794,119 B2 | 9/2004 | Miles |
| 6,819,380 B2 | 11/2004 | Wen et al. |
| 6,822,745 B2 | 11/2004 | De Groot et al. |
| 6,826,000 B2 | 11/2004 | Lee et al. |
| 6,829,258 B1 | 12/2004 | Carlisle |
| 6,841,787 B2 | 1/2005 | Almogy |
| 6,852,396 B1 | 2/2005 | Mineo |
| 6,853,418 B2 | 2/2005 | Suzuki et al. |
| 6,862,141 B2 | 3/2005 | Olczak |
| 6,864,882 B2 | 3/2005 | Newton |
| 6,865,312 B2 | 3/2005 | Niv et al. |
| 6,871,982 B2 | 3/2005 | Holman et al. |
| 6,879,354 B1 | 4/2005 | Sawayama |
| 6,880,959 B2 | 4/2005 | Houston |
| 6,882,461 B1 | 4/2005 | Tsai |
| 6,883,924 B2 | 4/2005 | Maeda et al. |
| 6,883,934 B2 | 4/2005 | Kawakami |
| 6,891,530 B2 | 5/2005 | Umemoto |
| 6,897,855 B1 | 5/2005 | Matthies |
| 6,930,816 B2 | 8/2005 | Mochizuki |
| 6,940,653 B2 | 9/2005 | Favalora et al. |
| 6,951,401 B2 | 10/2005 | Van Hees et al. |
| 6,961,045 B2 | 11/2005 | Tsao |
| 6,964,484 B2 | 11/2005 | Gupta |
| 6,967,779 B2 | 11/2005 | Fadel et al. |
| 6,972,827 B2 | 12/2005 | Mi |
| 6,998,196 B2 | 2/2006 | Rich et al. |
| 6,999,235 B2 | 2/2006 | Nakamura |

| | | | | | | |
|---|---|---|---|---|---|---|
| 7,002,726 | B2 | 2/2006 | Patel | 7,777,954 B2 | 8/2010 | Gruhike |
| 7,009,754 | B2 | 3/2006 | Huibers | 7,813,026 B2 | 10/2010 | Sampsell |
| 7,010,212 | B2 | 3/2006 | Emmons et al. | 7,845,841 B2 | 12/2010 | Sampsell |
| 7,012,659 | B2 | 3/2006 | Smith et al. | 7,880,954 B2 | 2/2011 | Sampsell |
| 7,018,088 | B2 | 3/2006 | Yu | 2001/0003504 A1 | 6/2001 | Ishihara |
| 7,025,461 | B2 | 4/2006 | Veligdan | 2001/0010630 A1 | 8/2001 | Umemoto |
| 7,030,949 | B2 | 4/2006 | Kashima | 2001/0019380 A1 | 9/2001 | Ishihara |
| 7,042,444 | B2 | 5/2006 | Cok | 2001/0019479 A1 | 9/2001 | Nakabayashi et al. |
| 7,042,643 | B2 | 5/2006 | Miles | 2001/0022636 A1 | 9/2001 | Yang et al. |
| 7,046,409 | B2 | 5/2006 | Kihara | 2001/0030861 A1 | 10/2001 | Oda |
| 7,050,219 | B2 | 5/2006 | Kimura | 2001/0049061 A1 | 12/2001 | Nakagaki |
| 7,054,045 | B2 | 5/2006 | McPheters | 2001/0055076 A1 | 12/2001 | Ochi et al. |
| 7,056,001 | B2 | 6/2006 | Chuang | 2001/0055208 A1 | 12/2001 | Kimura |
| 7,061,226 | B2 | 6/2006 | Durr | 2002/0006036 A1 | 1/2002 | Egawa |
| 7,064,875 | B2 | 6/2006 | Kawano | 2002/0034071 A1 | 3/2002 | Mabuchi |
| 7,072,093 | B2 | 7/2006 | Piehl | 2002/0044445 A1 | 4/2002 | Bohler |
| 7,072,096 | B2 | 7/2006 | Holman et al. | 2002/0051354 A1 | 5/2002 | Egawa |
| 7,110,158 | B2 | 9/2006 | Miles | 2002/0054258 A1 | 5/2002 | Kondo |
| 7,113,339 | B2 | 9/2006 | Taguchi et al. | 2002/0075555 A1 | 6/2002 | Miles |
| 7,123,216 | B1 | 10/2006 | Miles | 2002/0080465 A1 | 6/2002 | Han |
| 7,133,022 | B2 | 11/2006 | Grabert | 2002/0105699 A1 | 8/2002 | Miracky |
| 7,138,984 | B1 | 11/2006 | Miles | 2002/0106182 A1 | 8/2002 | Kawashima |
| 7,142,347 | B2 | 11/2006 | Islam | 2002/0135560 A1 | 9/2002 | Akaoka |
| 7,156,546 | B2 | 1/2007 | Higashiyama | 2002/0149584 A1 | 10/2002 | Simpson |
| 7,161,136 | B1 | 1/2007 | Wenstrand | 2002/0154256 A1 | 10/2002 | Gotoh |
| 7,161,730 | B2 | 1/2007 | Floyd | 2002/0167730 A1 | 11/2002 | Needham |
| 7,180,672 | B2 | 2/2007 | Olczak | 2002/0172039 A1 | 11/2002 | Inditsky |
| 7,187,489 | B2 | 3/2007 | Miles | 2002/0176035 A1 | 11/2002 | Yamazaki |
| 7,206,133 | B2 | 4/2007 | Cassarly | 2003/0012009 A1 | 1/2003 | Suzuki |
| 7,212,345 | B2 | 5/2007 | Wilson | 2003/0016930 A1 | 1/2003 | Inditsky |
| 7,218,429 | B2 | 5/2007 | Batchko | 2003/0030764 A1 | 2/2003 | Lee |
| 7,218,812 | B2 | 5/2007 | Maxwell | 2003/0034445 A1 | 2/2003 | Boyd |
| 7,221,418 | B2 | 5/2007 | Lee | 2003/0067760 A1 | 4/2003 | Jagt |
| 7,223,010 | B2 | 5/2007 | Min | 2003/0071947 A1 | 4/2003 | Shiraogawa |
| 7,236,663 | B2 | 6/2007 | Wakita et al. | 2003/0081154 A1 | 5/2003 | Coleman |
| 7,262,754 | B1 | 8/2007 | Yamazaki | 2003/0083429 A1 | 5/2003 | Smith |
| 7,262,916 | B2 | 8/2007 | Kao | 2003/0086030 A1 | 5/2003 | Taniguchi |
| 7,278,774 | B2 | 10/2007 | Chang | 2003/0086031 A1 | 5/2003 | Taniguchi |
| 7,324,284 | B2 | 1/2008 | Olczak | 2003/0090887 A1 | 5/2003 | Igarashi |
| 7,342,705 | B2 | 3/2008 | Chui et al. | 2003/0095401 A1 | 5/2003 | Hanson |
| 7,342,709 | B2 | 3/2008 | Lin | 2003/0098957 A1 | 5/2003 | Haldiman |
| 7,346,251 | B2 | 3/2008 | Bose | 2003/0099118 A1 | 5/2003 | Saitoh |
| 7,349,139 | B2 | 3/2008 | Chui | 2003/0103177 A1 | 6/2003 | Maeda |
| 7,349,141 | B2 | 3/2008 | Tung | 2003/0103344 A1 | 6/2003 | Niida |
| 7,352,501 | B2 | 4/2008 | Chopra et al. | 2003/0123245 A1 | 7/2003 | Parker |
| 7,352,940 | B2 | 4/2008 | Charters | 2003/0128538 A1 | 7/2003 | Shinohara et al. |
| 7,355,780 | B2 | 4/2008 | Chui | 2003/0151821 A1 | 8/2003 | Favalora |
| 7,357,552 | B2 | 4/2008 | Takada | 2003/0160919 A1 | 8/2003 | Suzuki |
| 7,357,557 | B2 | 4/2008 | Miyashita | 2003/0161040 A1 | 8/2003 | Ishii |
| 7,359,011 | B2 | 4/2008 | Hamada | 2003/0165067 A1 | 9/2003 | Imamura |
| 7,360,899 | B2 | 4/2008 | McGuire | 2003/0169385 A1 | 9/2003 | Okuwaki |
| 7,366,393 | B2 | 4/2008 | Cassarly | 2003/0184690 A1 | 10/2003 | Ogiwara |
| 7,376,308 | B2 | 5/2008 | Cheben et al. | 2003/0184989 A1 | 10/2003 | Matsumoto et al. |
| 7,377,678 | B2 | 5/2008 | Huang | 2003/0193630 A1 | 10/2003 | Chiou |
| 7,380,969 | B2 | 6/2008 | Yamashita | 2003/0210222 A1 | 11/2003 | Ogiwara |
| 7,380,970 | B2 | 6/2008 | Hwang | 2003/0210363 A1 | 11/2003 | Yasukawa |
| 7,388,181 | B2 | 6/2008 | Han et al. | 2003/0210367 A1 | 11/2003 | Nakano |
| 7,389,476 | B2 | 6/2008 | Senda et al. | 2003/0214728 A1 | 11/2003 | Olczak |
| 7,417,784 | B2 | 8/2008 | Sasagawa | 2003/0231483 A1 | 12/2003 | Higashiyama |
| 7,420,638 | B2 | 9/2008 | Tasaka et al. | 2004/0001169 A1 | 1/2004 | Saiki |
| 7,450,295 | B2 | 11/2008 | Tung | 2004/0017599 A1 | 1/2004 | Yang |
| 7,456,805 | B2 | 11/2008 | Ouderkirk | 2004/0027315 A1 | 2/2004 | Senda et al. |
| 7,477,809 | B1 | 1/2009 | Tan et al. | 2004/0032401 A1 | 2/2004 | Nakazawa |
| 7,508,571 | B2 | 3/2009 | Gally | 2004/0032659 A1 | 2/2004 | Drinkwater |
| 7,515,336 | B2 | 4/2009 | Lippey | 2004/0042233 A1 | 3/2004 | Suzuki |
| 7,520,642 | B2 | 4/2009 | Holman et al. | 2004/0051929 A1 | 3/2004 | Sampsell |
| 7,532,800 | B2 | 5/2009 | Iimura | 2004/0061946 A1 | 4/2004 | Yoshikawa |
| 7,545,569 | B2 | 6/2009 | Cassarly | 2004/0070711 A1 | 4/2004 | Wen |
| 7,561,133 | B2 | 7/2009 | Mestha | 2004/0080938 A1 | 4/2004 | Holman |
| 7,561,323 | B2 | 7/2009 | Gally | 2004/0085748 A1 | 5/2004 | Sugiura |
| 7,564,612 | B2 | 7/2009 | Chui | 2004/0100796 A1 | 5/2004 | Ward |
| 7,603,001 | B2 | 10/2009 | Wang | 2004/0109305 A1 | 6/2004 | Chisholm |
| 7,630,123 | B2 | 12/2009 | Kothari | 2004/0125048 A1 | 7/2004 | Fukuda |
| 7,663,714 | B2 | 2/2010 | Haga et al. | 2004/0135494 A1 | 7/2004 | Miyatake |
| 7,706,050 | B2 | 4/2010 | Sampsell | 2004/0170373 A1 | 9/2004 | Kim |
| 7,719,747 | B2 | 5/2010 | Tung | 2004/0174583 A1 | 9/2004 | Chen et al. |
| 7,733,439 | B2 | 6/2010 | Sampsell | 2004/0184134 A1 | 9/2004 | Makigaki |
| 7,750,886 | B2 | 7/2010 | Sampsell | 2004/0207995 A1 | 10/2004 | Park |
| 7,766,498 | B2 | 8/2010 | Sampsell | 2004/0217264 A1 | 11/2004 | Wood |

| | | | | | | |
|---|---|---|---|---|---|---|
| 2004/0218390 | A1 | 11/2004 | Holman et al. | 2007/0171418 | A1 | 7/2007 | Nyhart |
| 2004/0228109 | A1 | 11/2004 | Leu | 2007/0177405 | A1 | 8/2007 | Chan |
| 2004/0228112 | A1 | 11/2004 | Takata | 2007/0187852 | A1 | 8/2007 | Parker et al. |
| 2004/0246743 | A1 | 12/2004 | Lee | 2007/0189036 | A1 | 8/2007 | Chen |
| 2005/0002082 | A1 | 1/2005 | Miles | 2007/0196040 | A1 | 8/2007 | Wang |
| 2005/0002175 | A1 | 1/2005 | Matsui et al. | 2007/0201234 | A1 | 8/2007 | Ottermann |
| 2005/0024849 | A1 | 2/2005 | Parker | 2007/0210163 | A1 | 9/2007 | Han |
| 2005/0024890 | A1 | 2/2005 | Yamamoto | 2007/0229737 | A1 | 10/2007 | Takeda |
| 2005/0030732 | A1 | 2/2005 | Kimura | 2007/0229936 | A1 | 10/2007 | Miles |
| 2005/0041175 | A1 | 2/2005 | Akiyama | 2007/0236774 | A1 | 10/2007 | Gousev |
| 2005/0046011 | A1 | 3/2005 | Chen | 2007/0241340 | A1 | 10/2007 | Pan |
| 2005/0069254 | A1 | 3/2005 | Schultheis | 2007/0253717 | A1 | 11/2007 | Charters |
| 2005/0117190 | A1 | 6/2005 | Iwauchi et al. | 2007/0268695 | A1 | 11/2007 | Seetzen |
| 2005/0120553 | A1 | 6/2005 | Brown | 2007/0279727 | A1 | 12/2007 | Gandhi |
| 2005/0133761 | A1 | 6/2005 | Thielemans | 2007/0279935 | A1 | 12/2007 | Gardiner |
| 2005/0141065 | A1 | 6/2005 | Masamoto | 2007/0285406 | A1 | 12/2007 | Kukulj |
| 2005/0146897 | A1 | 7/2005 | Mimura | 2007/0291362 | A1 | 12/2007 | Hill et al. |
| 2005/0185416 | A1 | 8/2005 | Lee et al. | 2007/0292091 | A1 | 12/2007 | Fujii |
| 2005/0195175 | A1 | 9/2005 | Anderson | 2007/0297191 | A1 | 12/2007 | Sampsell |
| 2005/0195370 | A1 | 9/2005 | Gore | 2008/0030650 | A1 | 2/2008 | Kitagawa |
| 2005/0206802 | A1 | 9/2005 | Creemers | 2008/0049445 | A1 | 2/2008 | Harbers |
| 2005/0231977 | A1 | 10/2005 | Hayakawa | 2008/0049450 | A1 | 2/2008 | Sampsell |
| 2005/0231981 | A1 | 10/2005 | Hoelen et al. | 2008/0074402 | A1 | 3/2008 | Cornish |
| 2005/0248524 | A1 | 11/2005 | Feng | 2008/0079687 | A1 | 4/2008 | Cernasov |
| 2005/0253980 | A1 | 11/2005 | Saito | 2008/0084600 | A1 | 4/2008 | Bita et al. |
| 2005/0254771 | A1 | 11/2005 | Yamashita | 2008/0084602 | A1 | 4/2008 | Xu |
| 2005/0259939 | A1 | 11/2005 | Rinko | 2008/0089092 | A1 | 4/2008 | Lee et al. |
| 2005/0270798 | A1 | 12/2005 | Lee et al. | 2008/0090025 | A1 | 4/2008 | Freking |
| 2005/0271325 | A1 | 12/2005 | Anderson | 2008/0094853 | A1 | 4/2008 | Kim |
| 2005/0286113 | A1 | 12/2005 | Miles | 2008/0100900 | A1 | 5/2008 | Chui |
| 2006/0001942 | A1 | 1/2006 | Chui | 2008/0112039 | A1 | 5/2008 | Chui |
| 2006/0002141 | A1 | 1/2006 | Ouderkirk | 2008/0151347 | A1 | 6/2008 | Chui |
| 2006/0002675 | A1 | 1/2006 | Choi | 2008/0170414 | A1 | 7/2008 | Wang |
| 2006/0024017 | A1 | 2/2006 | Page | 2008/0192484 | A1 | 8/2008 | Lee |
| 2006/0044523 | A1 | 3/2006 | Teijido | 2008/0232135 | A1 | 9/2008 | Kinder |
| 2006/0050032 | A1 | 3/2006 | Gunner | 2008/0278460 | A1 | 11/2008 | Arnett et al. |
| 2006/0051048 | A1 | 3/2006 | Gardiner | 2008/0285307 | A1 | 11/2008 | Aylward |
| 2006/0061705 | A1 | 3/2006 | Onishi | 2009/0015753 | A1 | 1/2009 | Ye |
| 2006/0062016 | A1 | 3/2006 | Dejima | 2009/0050454 | A1 | 2/2009 | Matsukawa |
| 2006/0066541 | A1 | 3/2006 | Gally et al. | 2009/0086466 | A1 | 4/2009 | Sugita |
| 2006/0066586 | A1 | 3/2006 | Gally | 2009/0090611 | A1 | 4/2009 | Zeijlon |
| 2006/0066783 | A1 | 3/2006 | Sampsell | 2009/0097100 | A1 | 4/2009 | Gally |
| 2006/0066935 | A1 | 3/2006 | Cummings | 2009/0126777 | A1 | 5/2009 | Khazeni et al. |
| 2006/0067651 | A1 | 3/2006 | Chui | 2009/0126792 | A1 | 5/2009 | Gruhlke |
| 2006/0072315 | A1 | 4/2006 | Han et al. | 2009/0135469 | A1 | 5/2009 | Lee et al. |
| 2006/0072339 | A1 | 4/2006 | Li et al. | 2009/0147332 | A1 | 6/2009 | Bita et al. |
| 2006/0077124 | A1 | 4/2006 | Gally | 2009/0147535 | A1 | 6/2009 | Mienko |
| 2006/0077514 | A1 | 4/2006 | Sampsell | 2009/0168459 | A1 | 7/2009 | Holman |
| 2006/0083028 | A1 | 4/2006 | Sun et al. | 2009/0190373 | A1 | 7/2009 | Bita et al. |
| 2006/0110090 | A1 | 5/2006 | Ellwood | 2009/0196068 | A1 | 8/2009 | Wang |
| 2006/0114244 | A1 | 6/2006 | Saxena | 2009/0199893 | A1 | 8/2009 | Bita |
| 2006/0126142 | A1 | 6/2006 | Choi | 2009/0199900 | A1 | 8/2009 | Bita |
| 2006/0132383 | A1 | 6/2006 | Gally | 2009/0201301 | A1 | 8/2009 | Mienko |
| 2006/0146575 | A1 | 7/2006 | Saito | 2009/0201565 | A1 | 8/2009 | Bita et al. |
| 2006/0164861 | A1 | 7/2006 | Maeda | 2009/0201571 | A1 | 8/2009 | Gally |
| 2006/0181866 | A1 | 8/2006 | Jung | 2009/0225394 | A1 | 9/2009 | Chui |
| 2006/0181903 | A1 | 8/2006 | Okuwaki | 2009/0231877 | A1 | 9/2009 | Mienko |
| 2006/0187676 | A1 | 8/2006 | Ishikura | 2009/0244690 | A1 | 10/2009 | Lee |
| 2006/0198013 | A1 | 9/2006 | Sampsell | 2009/0251752 | A1 | 10/2009 | Gruhlke |
| 2006/0209012 | A1 | 9/2006 | Hagood | 2009/0251783 | A1 | 10/2009 | Huibers |
| 2006/0209385 | A1 | 9/2006 | Liu et al. | 2009/0255569 | A1 | 10/2009 | Sampsell |
| 2006/0215958 | A1 | 9/2006 | Yeo | 2009/0296193 | A1 | 12/2009 | Bita et al. |
| 2006/0262562 | A1 | 11/2006 | Fukasawa | 2009/0296194 | A1 | 12/2009 | Gally |
| 2006/0265919 | A1 | 11/2006 | Huang | 2009/0303417 | A1* | 12/2009 | Mizushima et al. ............ 349/65 |
| 2006/0268574 | A1 | 11/2006 | Jung | 2009/0303746 | A1 | 12/2009 | Wang |
| 2006/0274400 | A1 | 12/2006 | Miles | 2009/0310208 | A1 | 12/2009 | Wang |
| 2006/0285356 | A1 | 12/2006 | Tseng | 2009/0320899 | A1 | 12/2009 | Schiavoni |
| 2006/0291769 | A1 | 12/2006 | Spoonhower et al. | 2009/0323144 | A1 | 12/2009 | Gruhlke |
| 2007/0036492 | A1 | 2/2007 | Lee | 2009/0323153 | A1 | 12/2009 | Sampsell |
| 2007/0064294 | A1 | 3/2007 | Hoshino et al. | 2010/0026727 | A1 | 2/2010 | Bita et al. |
| 2007/0081360 | A1 | 4/2007 | Bailey | 2010/0033988 | A1 | 2/2010 | Chiu |
| 2007/0097694 | A1 | 5/2007 | Faase | 2010/0051089 | A1 | 3/2010 | Khazeni |
| 2007/0116424 | A1 | 5/2007 | Ting | 2010/0053148 | A1 | 3/2010 | Khazeni |
| 2007/0125415 | A1 | 6/2007 | Sachs | 2010/0141557 | A1 | 6/2010 | Gruhlke |
| 2007/0133226 | A1 | 6/2007 | Mi | 2010/0149624 | A1 | 6/2010 | Kothari |
| 2007/0133935 | A1 | 6/2007 | Fine | 2010/0157406 | A1 | 6/2010 | Gruhlke |
| 2007/0147087 | A1 | 6/2007 | Parker | 2010/0172012 | A1 | 7/2010 | Sampsell |
| 2007/0153243 | A1 | 7/2007 | Mestha et al. | 2010/0177533 | A1 | 7/2010 | Griffiths |
| 2007/0171330 | A1 | 7/2007 | Hung | 2010/0182308 | A1 | 7/2010 | Holman |

| | | | | | | |
|---|---|---|---|---|---|---|
| 2010/0188367 | A1 | 7/2010 | Nagafuji et al. | JP | 06-265870 A | 9/1994 |
| 2010/0214642 | A1 | 8/2010 | Miles | JP | 07-509327 | 10/1995 |
| 2010/0278480 | A1 | 11/2010 | Vasylyev | JP | 08 050283 A | 2/1996 |
| 2010/0309103 | A1 | 12/2010 | Sampsell | JP | 09 022012 | 1/1997 |
| | | | | JP | 09 160032 | 6/1997 |

FOREIGN PATENT DOCUMENTS

| | | | | | |
|---|---|---|---|---|---|
| CN | 1381752 | 11/2002 | JP | 09 311333 | 12/1997 |
| CN | 1639596 A | 7/2005 | JP | 10 500224 | 1/1998 |
| CN | 1643439 A | 7/2005 | JP | 10-096910 | 4/1998 |
| CN | 1795403 A | 6/2006 | JP | 10 202948 | 8/1998 |
| CN | 101226259 | 7/2008 | JP | 10 325953 | 12/1998 |
| DE | 34 02 746 | 8/1985 | JP | 11-052887 | 2/1999 |
| DE | 196 22 748 | 12/1997 | JP | 11 174234 | 7/1999 |
| DE | 199 42 513 | 3/2001 | JP | 11 211999 | 8/1999 |
| DE | 102007025092 | 12/2008 | JP | 11 231321 | 8/1999 |
| EP | 0 278 038 | 8/1988 | JP | 11 232919 | 8/1999 |
| EP | 0 539 099 | 4/1993 | JP | 11 249132 | 9/1999 |
| EP | 0 590 511 | 4/1994 | JP | 11 316553 | 11/1999 |
| EP | 0 621 500 | 10/1994 | JP | 2000-028933 | 1/2000 |
| EP | 0 822 441 | 2/1998 | JP | 2000-075287 | 3/2000 |
| EP | 0 867 747 A2 | 9/1998 | JP | 2000 075293 | 3/2000 |
| EP | 0 879 991 | 11/1998 | JP | 2000 081848 | 3/2000 |
| EP | 0 907 050 | 4/1999 | JP | 2000 181367 | 6/2000 |
| EP | 0 907 050 A1 | 4/1999 | JP | 2000 193933 | 7/2000 |
| EP | 0 957 392 | 11/1999 | JP | 2000 214804 A | 8/2000 |
| EP | 0 984 314 | 3/2000 | JP | 2000 514568 | 10/2000 |
| EP | 1 079 264 | 2/2001 | JP | 2000 305074 | 11/2000 |
| EP | 1 089 115 | 4/2001 | JP | 2001-021883 | 1/2001 |
| EP | 1 093 105 | 4/2001 | JP | 2001 305312 | 10/2001 |
| EP | 1 113 218 | 7/2001 | JP | 2001 343514 | 12/2001 |
| EP | 1 116 987 | 7/2001 | JP | 2002-014344 | 1/2002 |
| EP | 1 127 984 | 8/2001 | JP | 2002 72284 | 3/2002 |
| EP | 1 143 270 | 10/2001 | JP | 2002 090549 | 3/2002 |
| EP | 1 199 512 | 4/2002 | JP | 2002-108227 | 4/2002 |
| EP | 1231757 | 8/2002 | JP | 2002 174732 | 6/2002 |
| EP | 1 251 454 | 10/2002 | JP | 2002 196151 | 7/2002 |
| EP | 1 271 223 | 1/2003 | JP | 2002 523798 | 7/2002 |
| EP | 1 296 094 | 3/2003 | JP | 2002-229023 | 8/2002 |
| EP | 1 306 609 | 5/2003 | JP | 2002 245835 | 8/2002 |
| EP | 1 329 664 | 7/2003 | JP | 2002-297044 | 10/2002 |
| EP | 1 336 876 | 8/2003 | JP | 2003 007114 | 1/2003 |
| EP | 1 341 025 | 9/2003 | JP | 2003 057652 | 2/2003 |
| EP | 1 347 315 | 9/2003 | JP | 2003 057653 | 2/2003 |
| EP | 1 389 775 | 2/2004 | JP | 2003 066451 | 3/2003 |
| EP | 1389775 | 2/2004 | JP | 2003 131215 | 5/2003 |
| EP | 1 413 543 | 4/2004 | JP | 2003-140118 | 5/2003 |
| EP | 1 437 610 | 7/2004 | JP | 2003-149642 | 5/2003 |
| EP | 1 445 629 | 8/2004 | JP | 2003-149643 | 5/2003 |
| EP | 1 450 418 | 8/2004 | JP | 2003 173713 | 6/2003 |
| EP | 1 519 218 | 3/2005 | JP | 2003 177336 | 6/2003 |
| EP | 1 531 302 | 5/2005 | JP | 2003 188959 | 7/2003 |
| EP | 1 544 537 | 6/2005 | JP | 2003 195201 | 7/2003 |
| EP | 1 577 701 | 9/2005 | JP | 2003-315694 | 11/2003 |
| EP | 1 640 961 | 3/2006 | JP | 2003 344881 | 12/2003 |
| EP | 1 698 918 | 9/2006 | JP | 2004-012918 | 1/2004 |
| EP | 1 732 141 A | 12/2006 | JP | 2004-062099 | 2/2004 |
| EP | 1 734 401 | 12/2006 | JP | 2004-070189 | 3/2004 |
| EP | 1 748 305 | 1/2007 | JP | 2004 087409 | 3/2004 |
| EP | 1 762 778 A | 3/2007 | JP | 2004-126196 | 4/2004 |
| EP | 1 832 806 | 9/2007 | JP | 2004-510185 | 4/2004 |
| EP | 1 870 635 | 12/2007 | JP | 2004 145109 | 5/2004 |
| EP | 1 975 651 | 10/2008 | JP | 2004-206049 | 7/2004 |
| EP | 2 040 114 | 3/2009 | JP | 2004-219843 A | 8/2004 |
| EP | 2 068 181 | 6/2009 | JP | 2004-534280 A | 11/2004 |
| EP | 2 068 182 | 6/2009 | JP | 2005-031219 | 2/2005 |
| FR | 2 889 597 A | 2/2007 | JP | 2005-259365 | 9/2005 |
| GB | 2 260 203 | 4/1993 | JP | 2005-316178 | 11/2005 |
| GB | 2 278 222 | 11/1994 | JP | 2006-065360 A | 3/2006 |
| GB | 2 315 356 | 1/1998 | JP | 2006 107993 | 4/2006 |
| GB | 2 321 532 | 7/1998 | JP | 2006 120571 | 5/2006 |
| GB | 2 336 933 | 3/1999 | JP | 2007-218540 A | 8/2007 |
| GB | 2 331 615 | 5/1999 | JP | 2008 103110 | 5/2008 |
| GB | 2 340 281 | 2/2000 | JP | 2009 0300966 | 12/2009 |
| GB | 2 351 834 | 1/2001 | TW | 567388 | 12/2003 |
| JP | 57-3266 | 1/1982 | WO | WO 94/06871 A1 | 3/1994 |
| JP | 58 115781 | 8/1983 | WO | WO 95/01584 | 1/1995 |
| JP | 60 165621 A | 8/1985 | WO | WO 95/14256 | 5/1995 |
| JP | 60 242408 | 12/1985 | WO | WO 95/15582 A1 | 6/1995 |
| JP | 05 281479 | 10/1993 | WO | WO 95/30924 | 11/1995 |

| | | |
|---|---|---|
| WO | WO 96/16348 | 5/1996 |
| WO | WO 97/01240 | 1/1997 |
| WO | WO 97/16756 | 5/1997 |
| WO | WO 97/17628 | 5/1997 |
| WO | WO 97/46908 | 12/1997 |
| WO | WO 98/19201 | 5/1998 |
| WO | WO 98/32047 | 7/1998 |
| WO | WO 98/35182 | 8/1998 |
| WO | WO 98/52094 | 11/1998 |
| WO | WO 99/04296 A | 1/1999 |
| WO | WO 99/63394 | 12/1999 |
| WO | WO 99/64785 A | 12/1999 |
| WO | WO 00/11502 | 3/2000 |
| WO | WO 00/50807 | 8/2000 |
| WO | WO 01/29148 | 4/2001 |
| WO | WO 01/57434 | 8/2001 |
| WO | WO 01/81994 | 11/2001 |
| WO | WO 01/84228 | 11/2001 |
| WO | WO 01/84229 | 11/2001 |
| WO | WO 02/06858 | 1/2002 |
| WO | WO 02/071132 | 9/2002 |
| WO | WO 02/097324 | 12/2002 |
| WO | WO 03/007049 | 1/2003 |
| WO | WO 03/038509 | 5/2003 |
| WO | WO 03/056876 | 7/2003 |
| WO | WO 03/062912 | 7/2003 |
| WO | WO 03/105198 | 12/2003 |
| WO | WO 2004/003643 | 1/2004 |
| WO | WO 2004/006003 | 1/2004 |
| WO | WO 2004/012004 | 2/2004 |
| WO | WO 2004/015489 | 2/2004 |
| WO | WO 2004/027514 | 4/2004 |
| WO | WO 2004/036270 | 4/2004 |
| WO | WO 2004/088372 | 10/2004 |
| WO | WO 2004/114418 | 12/2004 |
| WO | WO 2004/114418 A1 | 12/2004 |
| WO | WO 2005/011012 | 2/2005 |
| WO | WO 2005/076051 | 8/2005 |
| WO | WO 2005/088367 | 9/2005 |
| WO | WO 2005/111669 | 11/2005 |
| WO | WO 2006/008702 | 1/2006 |
| WO | WO 2006/036415 | 4/2006 |
| WO | WO 2006/036496 | 4/2006 |
| WO | WO 2006/036496 A1 | 4/2006 |
| WO | WO 2007/064133 | 6/2007 |
| WO | WO 2007/073203 A1 | 6/2007 |
| WO | WO 2007/094558 | 8/2007 |
| WO | WO 2008/038754 | 4/2008 |
| WO | WO 2008/045200 | 4/2008 |
| WO | WO 2008/045207 | 4/2008 |
| WO | WO 2008/045218 | 4/2008 |
| WO | WO 2008/045311 | 4/2008 |
| WO | WO 2008/045364 | 4/2008 |
| WO | WO 2008/145096 | 12/2008 |
| WO | WO 2009/011922 A1 | 1/2009 |
| WO | WO 2009/073555 | 6/2009 |
| WO | WO 2009/129264 | 10/2009 |

OTHER PUBLICATIONS

Maeda et al., "A study of a high quality front lighting system for reflective full-color liquid crystal displays", Record of Electrical and Communication, Engineering Conversazione Tohoku University, v 78, n 1, 415-16, Sep. 2009, ISSN: 0385-7719.
Zhou et al., "Waveguide Panel Display Using Electromechanical Spatial Modulators" SID Digest, vol. XXIX, 1998.
International Preliminary Report and Written Opinion in PCT/US2009/040561 dated Oct. 28, 2010.
International Search Report and Written Opinion dated Jul. 17, 2009 from International Application No. PCT/US2009/040561, filed on Apr. 14, 2009.
Imenes et al., "Spectral beam splitting technology for increased conversion efficiency in solar concentrating systems: a review" Solar Energy Materials, Elsevier Science Publishers B.V. Amsterdam, NL, vol. 84, Oct. 1, 2004, pp. 19-69, XP002474546.
Partial European Search Report in EP10176266 dated Dec. 9, 2010.
Extended European Search Report in EP10176261 dated Dec. 8, 2010.
Extended European Search Report in App. No. 08153691.4 (Publication No. EP 2068182) dated Mar. 25, 2009.
Extended Search Report in European App. No. 08153690 (Publication No. EP 2068181 ) dated Mar. 5, 2009.
Extended Search Report in European Application No. 08075318.9 (Published EP 2 040 114), dated Mar. 5, 2009.
International Preliminary Report on Patentability in PCT/US2005/030441 dated Apr. 5, 2007.
International Preliminary Report on Patentability in PCT/US2008/085010 (International Pub. No. WO 2009/073555) dated Apr. 12, 2010.
International Search Report and Written Opinion in PCT/US2005/030441(International Publication No. WO 2006/036415) dated Dec. 12, 2005.
International Search Report and Written Opinion in PCT/US2008/085010 (International Pub. No. WO 2009/073555) dated Mar. 4, 2009.
Office Action in U.S. Appl. No. 11/187,784, dated Oct. 7, 2008.
Amendment and Response in U.S. Appl. No. 11/187,784, dated Nov. 19, 2008.
Office Action in U.S. Appl. No. 11/187,784, dated Feb. 17, 2009.
Examiner Interview Summary in U.S. Appl. No. 11/187,784, dated Mar. 25, 2009.
Amendment and Response in U.S. Appl. No. 11/187,784, dated Mar. 30, 2009.
Examiner Interview Summary and Notice of Allowance in U.S. Appl. No. 11/187,784, dated Jun. 5, 2009.
Request for Continued Examination and Information Disclosure Statement in U.S. Appl. No. 11/187,784, dated Sep. 3, 2009.
Notice of Allowance in U.S. Appl. No. 11/187,784, dated Oct. 21, 2009.
Request for Continued Examination and Information Disclosure Statement in U.S. Appl. No. 11/187,784, dated Jan. 20, 2010.
Notice of Allowance in U.S. Appl. No. 11/187,784, dated Feb. 8, 2010.
Amendment Under 37 C.F.R. § 1.312 in U.S. Appl. No. 11/187,784, dated May 7, 2010.
Official Communication in Chinese Application No. 200580030964.X, dated Jun. 6, 2008.
Official Communication in European Application No. 05791508.4, dated Jul. 19, 2007.
Official Communication in European Application No. 08075318.9, dated Oct. 30, 2009.
Official Communication in Japanese Application No. 2007-533487, dated Sep. 7, 2010.
Substantive Examination in Malaysian Application No. PI20054177, dated Apr. 10, 2009.
Substantive Examination in Malaysian Application No. PI20054177, dated Dec. 15, 2009.
Office Action in U.S. Appl. No. 11/952,872, dated Mar. 10, 2009.
Amendment, Response, and Applicant Summary of Interview in U.S. Appl. No. 11/952,872, dated Jun. 10, 2009.
Office Action in U.S. Appl. No. 11/952,872, dated Oct. 7, 2009.
Request for Continued Examination and Amendment in U.S. Appl. No. 11/952,872, dated Feb. 8, 2010.
Office Action in U.S. Appl. No. 11/952,872, dated Mar. 24, 2010.
Examiner Interview Summary in U.S. Appl. No. 11/952,872, dated Jul. 14, 2010.
Amendment, Response, and Applicant Summary of Interview in U.S. Appl. No. 11/952,872, dated Aug. 24, 2010.
Official Communication in European Application No. 08153690.6 (Publication No. EP 2068181), dated Jan. 19, 2010.
Official Communication in European Application No. 08153691.4 (Publication No. EP 2068182), dated Jan. 19, 2010.
Fan et al., "Channel Drop Filters in Photonic Crystals", Optics Express, vol. 3, No. 1, pp. 4-11, 1998.
Giles et al., " Silicon MEMS Optical Switch Attenuator and Its Use in Lightwave Subsystems", IEEE Journal of Selected Topics in Quantum Electronics, vol. 5. No. 1, pp. 18-25, Jan./Feb. 1999.
Goosen, "MEMS-Based Variable Optical Interference Devices", IEEE/LEOS International Conference on Optical Mems, pp. 17-18, Aug. 2000.

Little et al., "Vertically Coupled Microring Rosonator Channel Dropping Filter", IEEE Photonics Technology Letters, vol. 11, No. 2, pp. 215-217, 1999.

Magel, "Integrated Optic Devices Using Micromachined Metal Membranes", SPIE vol. 2686, 0-8194-2060-3, pp. 54-63, 1996.

Mehregany et al., "MEMS Applications in Optical Systems", IEEE/LEOS 1996 Summer Topical Meetings, pp. 75-76, Aug. 5-9, 1996.

Miles et al., "Digital Paper for reflective displays," Journal of the Society for Information Display, San Jose, CA, vol. 11, No. 1, pp. 209-215, 2003.

Miles, "Interferometric Modulation: MOEMS as an enabling technology for high-performance reflective displays," Proceedings of the SPIE, vol. 4985, pp. 131-139, 2003.

Neal T.D., et al., "Surface Plasmon enhanced emission from dye doped polymer layers," Optics Express Opt. Soc. America, USA, vol. 13, No. 14, pp. 5522-5527, Jul. 11, 2005.

Obi et. al., Fabrication of Optical MEMS in Sol-Gel Materials; IEEE/LEOS International Conference on Optical Mems, pp. 39-40, Aug. 2002.

Oliner, "Radiating Elements and Mutual Coupling," Microwave Scanning Antennas, vol. 2, pp. 131-157 and pp. 190-194, 1966.

OSRAM Opto Semiconductors, "Multi Micro SIDELED," Preliminary Data, Dec. 11, 2008.

Tai C.Y., et. al., "A Transparent Frontlighting System for Reflective-Type Displays," 1995 SID International Symposium Digest of Technical Papers, vol. 26, pp. 375-378, May 23, 1995.

Yan, et al., "Edge-Lighting Light Guide Plate Based on Micro-Prism for Liquid Crystal Display," Journal of Display Technology, vol. 5, No. 9, pp. 355-357, Sep. 2009.

Yu, et al., "Design Optimization and Stamper Fabrication of Light Guiding Plates Using Silicon Based Micro-Features," IEEE Symposium on DTIP of MEMS/MOEMS, Rome, Apr. 1-3, 2009.

* cited by examiner

|  | Column Output Signals | |
|---|---|---|
|  | + $V_{bias}$ | - $V_{bias}$ |
| 0 | Stable | Stable |
| + $\Delta V$ | Relax | Actuate |
| - $\Delta V$ | Actuate | Relax |

Row Output Signals

LIGHT WITH BI-DIRECTIONAL PROPAGATION

CROSS-REFERENCE TO RELATED APPLICATIONS

This application claims the benefit of U.S. Provisional Application No. 61/045,250 filed on Apr. 15, 2008, titled "LIGHT WITH BI-DIRECTIONAL PROPAGATION," which is hereby expressly incorporated by reference in its entirety.

BACKGROUND

1. Field

The field of the invention relates to electromechanical systems.

2. Description of the Related Technology

Electromechanical systems include devices having electrical and mechanical elements, actuators, transducers, sensors, optical components (e.g., mirrors), and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers or that add layers to form electrical and electromechanical devices. One type of electromechanical systems device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments," one will understand how the features of this invention provide advantages over other display devices.

Various embodiments described herein comprise a display device including a reflector and turning features configured to turn light propagating from opposite directions to exit a turning film and be received at a display.

In one embodiment, a display device comprises a reflective spatial light modulator, a first light guide aligned over the modulator, the first light guide comprising a top surface disposed distal to the modulator and a bottom surface disposed proximate to the modulator, the first light guide further comprising a first end surface and a second end surface, a second light guide disposed between the modulator and the first light guide, the second light guide comprising a top surface disposed distal to the modulator and a bottom surface disposed proximate to the modulator, the second light guide further comprising a first end surface and a second end surface, a light source in optical communication with the first light guide and the second light guide, the light source configured to provide light through the first end surface of the first light guide and through the first end surface of the second light guide, and a turning mirror disposed to receive light emitted from the second light guide second end surface and direct the light to the second end surface of the first light guide, the first light guide further comprising turning features configured to direct light that enters the first light guide first end surface and light that enters the first light guide second end surface through the bottom surface of the first light guide to the modulator.

Other aspects can be included in the embodiments described herein. For example, the reflective spatial light modulator can comprise an electromechanical system. The reflective spatial light modulator can comprise a plurality of interferometric modulators. Each interferometric modulator can comprise a movable reflective layer, a fixed reflective layer, and an optical resonant gap defined by the movable reflective layer and the fixed reflective layer. The light source can comprise a light emitting diode and/or a light bar. The second light guide can comprise a film stack. The device can further comprise a diffuser layer between the first light guide and the second light guide. The turning features can comprise a reflective, refractive, holographic or diffractive optical element, can comprise grooves, and/or can comprise symmetric features configured to turn light propagating in two directions in the first light guide to the reflective spatial light modulator. The turning mirror can include a curved reflective surface, which may be elliptical and can have foci proximal to ends of the first and second light guides. The turning mirror can comprises at least two planar surfaces forming an angle therebetween, and the angle may be between about 90 and about 120 degrees, about 90 degrees, or about 120 degrees. The turning mirror can include a metallized surface, and/or reflective dielectric stack.

Some embodiments of the display device can further comprise a processor that is configured to communicate with the spatial light modulator, the processor being configured to process image data, and a memory device that is configured to communicate with the processor. The display device can further comprise driver circuit configured to send at least one signal to the spatial light modulator. The display device can further include a controller configured to send at least a portion of the image data to the driver circuit. The display device can further include an image source module configured to send the image data to the processor. The image source module can comprise at least one of a receiver, transceiver, and transmitter. The display device can further include an input device configured to receive input data and to communicate the input data to the processor.

In another embodiment, a display device comprises a first light guide comprising a front and back surface and edge surfaces, the first light guide configured to receive light through two or more edge surfaces, and direct the received light towards the back surface, a second light, a second light guide comprising front and back surfaces and edge surfaces, the light guide disposed under the back surface of the first light guide, the second light guide configured to receive light through one or more edge surfaces and emit light through at least one edge surface, and a turning mirror disposed to receive light emitted from the second light guide, and direct the light into at least one edge surface of the first light guide.

Another embodiment comprises a method of manufacturing a display device comprising providing a reflective spatial light modulator, aligning a first light guide over the reflective spatial light modulator, the first light guide having a first surface and a second surface, disposing a second light guide between the modulator and the first light guide, the second light guide having a first surface and a second surface, disposing a light source relative to the first and second light guides, the light source configured to provide light into the first surface of the first light guide and the first surface of the second light guide, and disposing a turning mirror relative to the first and second light guides, the turning mirror configured to receive light emitted from the second surface of the second light guide and direct the light into the second surface of the first light guide.

Another embodiment comprises reflective means, first light guide means configured to direct light propagating therein to the reflective means, second light guide means, light source means in optical communication with the first light guide means and the second light guide means, and light turning means configured to receive light emitted from the second light guide means and direct the light to the first light guide means.

DETAILED DESCRIPTION OF CERTAIN EMBODIMENTS

The following detailed description is directed to certain specific embodiments. However, the teachings herein can be applied in a multitude of different ways. In this description, reference is made to the drawings wherein like parts are designated with like numerals throughout. The embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

In various embodiments described herein, a display device includes a first light configured to direct light towards a reflective spatial light modulator. In one embodiment, the reflective spatial light modulator may be a display, for example, an interferometric modulator, MEMS device, or a liquid crystal structure. A second light guide may be disposed between the first light guide and the spatial light modulator. In some embodiments, a light source may provide light into the first light guide and the second light guide and the light may propagate within the first light guide and the second light guide. A turning mirror may be configured to receive light emitted from the second light guide and direct the light into the first light guide in order to direct that light towards the reflective spatial light modulator. In some embodiments, inputting light into two light guides and turning light from one light guide to another may: 1) save light that otherwise would be lost; 2) enable the reduction or increase in front light thickness; 3) provide more light to the otherwise dim portions of the display; and/or 4) increase the overall brightness of a display.

Figure 1:
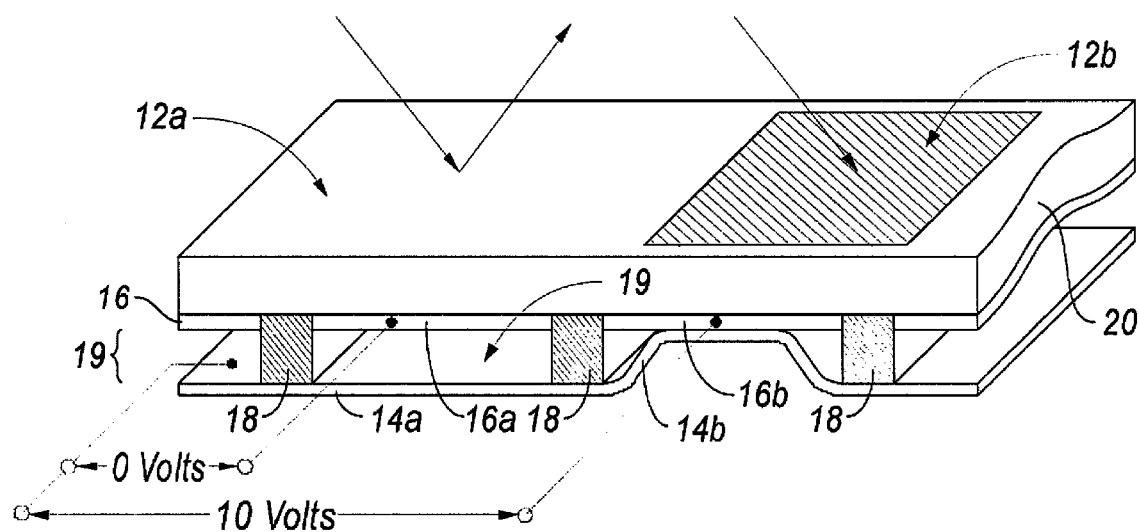
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("relaxed" or "open") state, the display element reflects a large portion of incident visible light to a user. When in the dark ("actuated" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) to form columns deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device. Note that FIG. 1 may not be to scale. In some embodiments, the spacing between posts 18 may be on the order of 10-100 um, while the gap 19 may be on the order of <1000 Angstroms.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential (voltage) difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by actuated pixel 12b on the right in FIG. 1. The behavior is the same regardless of the polarity of the applied potential difference.

FIGS. 2 through 5 illustrate one exemplary process and system for using an array of interferometric modulators in a display application.

Figure 2:
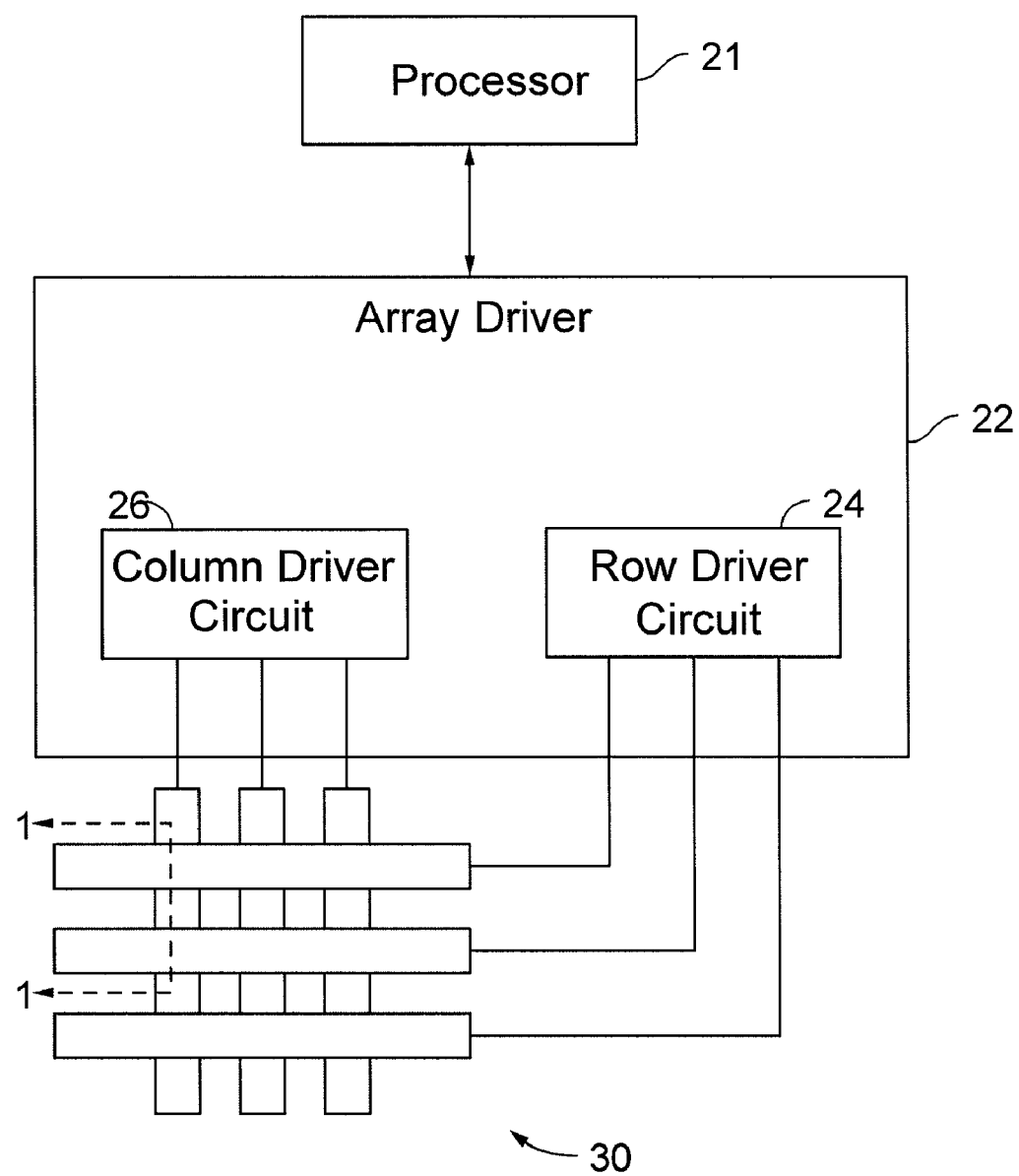
FIG. 2 is a system block diagram illustrating one embodiment of an electronic device incorporating a 3×3 interferometric modulator display.

FIG. 2 is a system block diagram illustrating one embodiment of an electronic device that may incorporate interferometric modulators. The electronic device includes a processor 21 which may be any general purpose single- or multi-chip microprocessor such as an ARM®, Pentium®, 8051, MIPS®, Power PC®, or ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. Note that although FIG. 2 illustrates a 3×3 array of interferometric modulators for the sake of clarity, the display array 30 may contain a very large number of interferometric modulators, and may have a different number of interferometric modulators in rows than in columns (e.g., 300 pixels per row by 190 pixels per column).

Figures 3, 4:
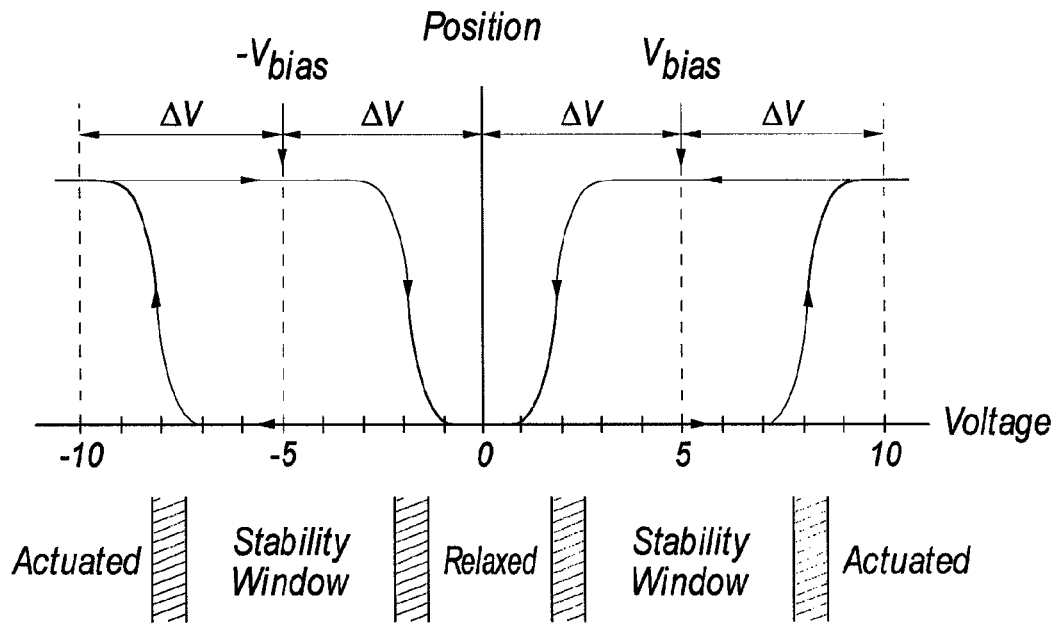
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIG. 3 is a diagram of movable mirror position versus applied voltage for one exemplary embodiment of an interferometric modulator of FIG. 1. For MEMS interferometric modulators, the row/column actuation protocol may take advantage of a hysteresis property of these devices as illustrated in FIG. 3. An interferometric modulator may require, for example, a 10 volt potential difference to cause a movable layer to deform from the relaxed state to the actuated state.

However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state or bias voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

As described further below, in typical applications, a frame of an image may be created by sending a set of data signals (each having a certain voltage level) across the set of column electrodes in accordance with the desired set of actuated pixels in the first row. A row pulse is then applied to a first row electrode, actuating the pixels corresponding to the set of data signals. The set of data signals is then changed to correspond to the desired set of actuated pixels in a second row. A pulse is then applied to the second row electrode, actuating the appropriate pixels in the second row in accordance with the data signals. The first row of pixels are unaffected by the second row pulse, and remain in the state they were set to during the first row pulse. This may be repeated for the entire series of rows in a sequential fashion to produce the frame. Generally, the frames are refreshed and/or updated with new image data by continually repeating this process at some desired number of frames per second. A wide variety of protocols for driving row and column electrodes of pixel arrays to produce image frames may be used.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to $-5$ volts and $+5$ volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
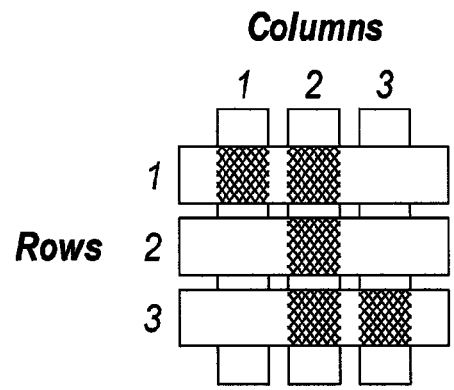
FIGS. 5A and 5B illustrate one exemplary timing diagram for row and column signals that may be used to write a frame of display data to the 3×3 interferometric modulator display of FIG. 2.
Figure 5B:
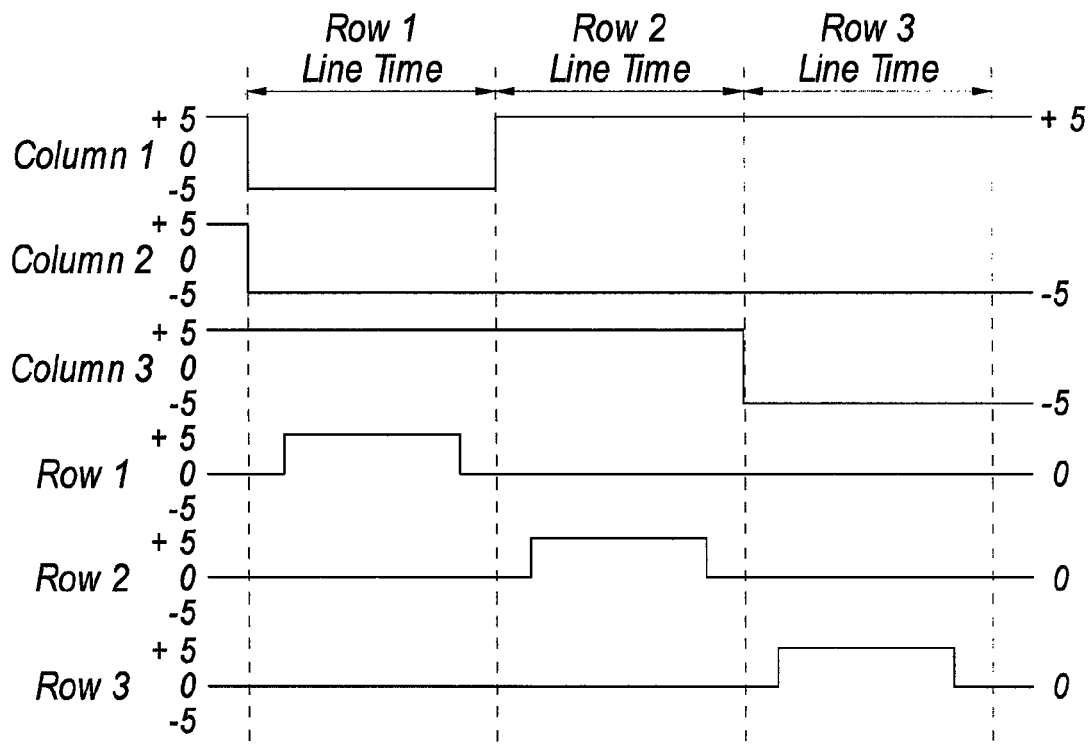

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are initially at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. The same procedure can be employed for arrays of dozens or hundreds of rows and columns. The timing, sequence, and levels of voltages used to perform row and column actuation can be varied widely within the general principles outlined above, and the above example is exemplary only, and any actuation voltage method can be used with the systems and methods described herein.

Figure 6A:
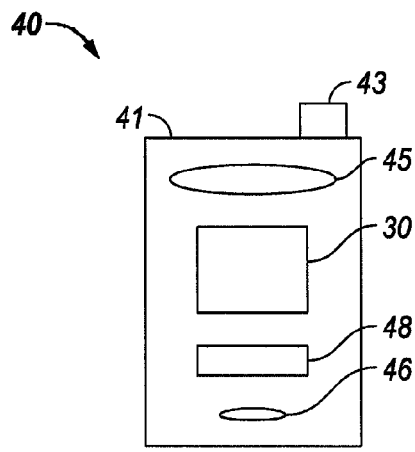
FIGS. 6A and 6B are system block diagrams illustrating an embodiment of a visual display device comprising a plurality of interferometric modulators.
Figure 6B:
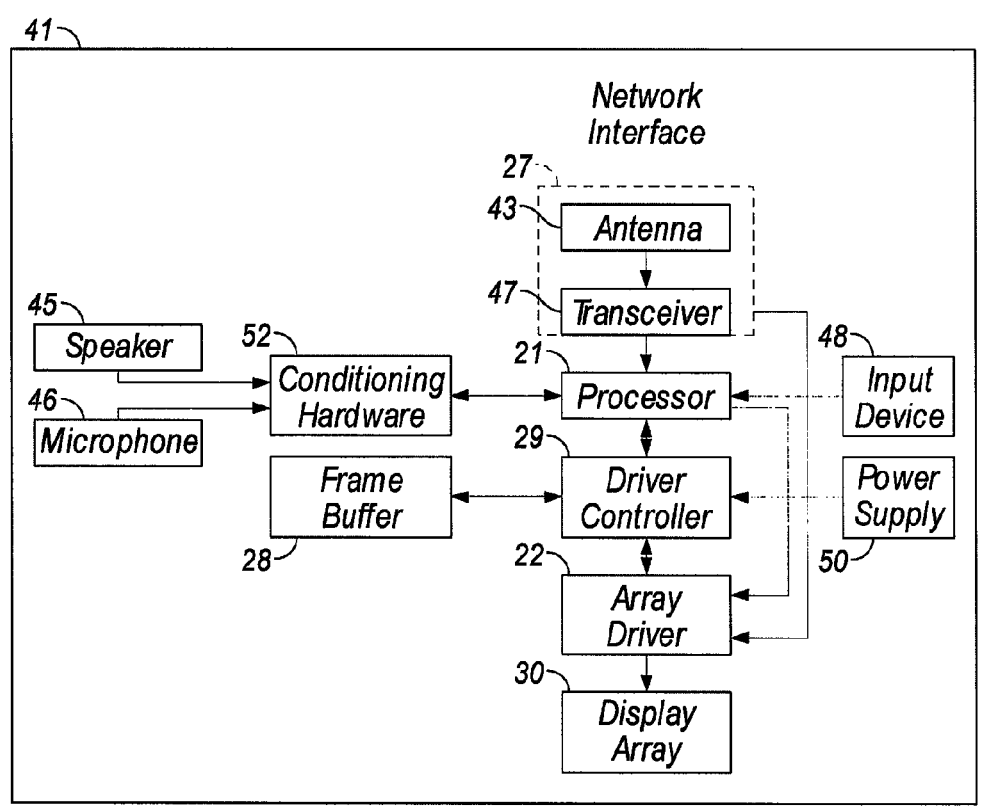

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, W-CDMA, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. The above-described optimization may be implemented in any number of hardware and/or software components and in various configurations.

Figure 7A:
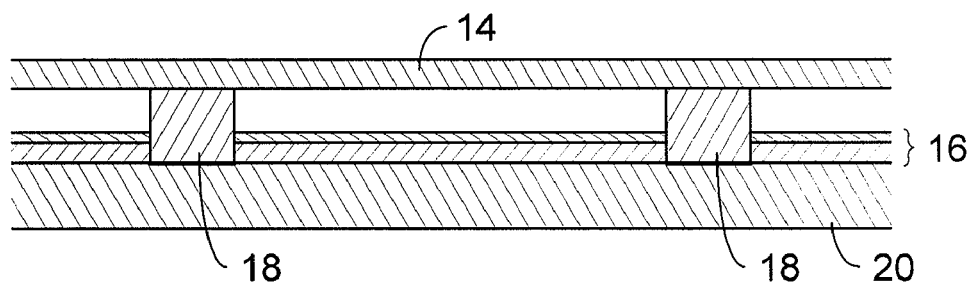
FIG. 7A is a cross section of the device of FIG. 1.
Figure 7B:
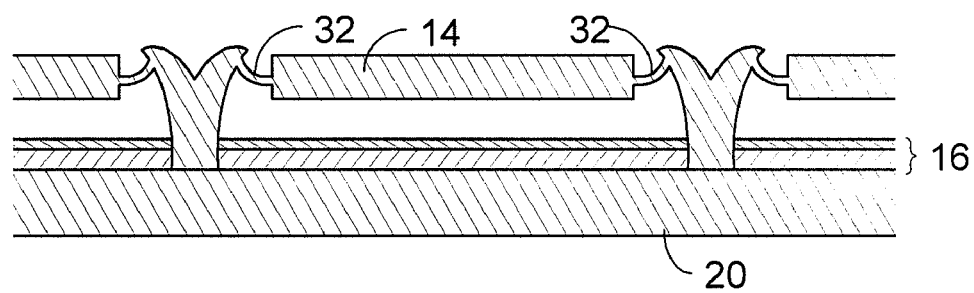
FIG. 7B is a cross section of an alternative embodiment of an interferometric modulator.
Figure 7C:
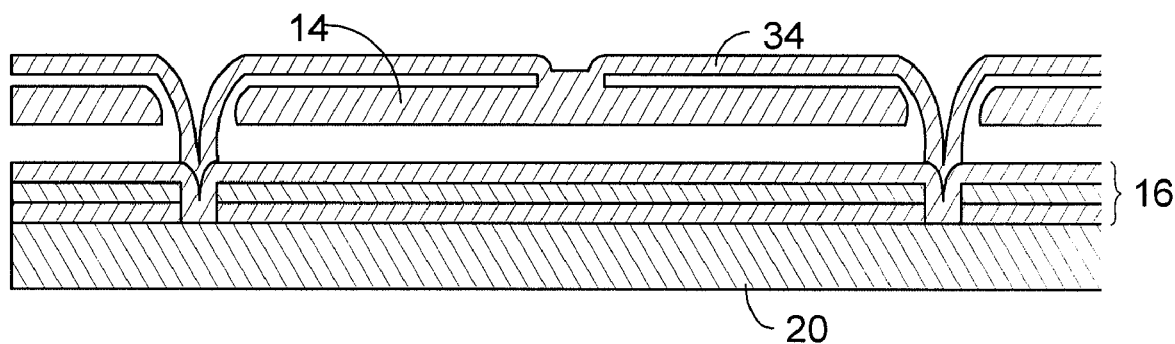
FIG. 7C is a cross section of another alternative embodiment of an interferometric modulator.
Figure 7D:
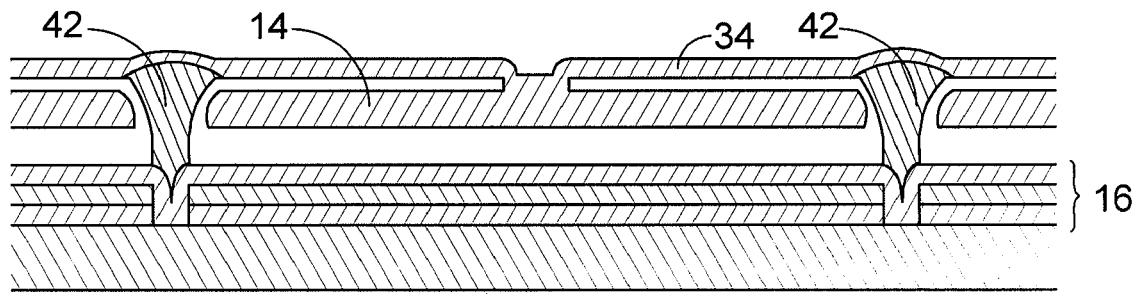
FIG. 7D is a cross section of yet another alternative embodiment of an interferometric modulator.
Figure 7E:
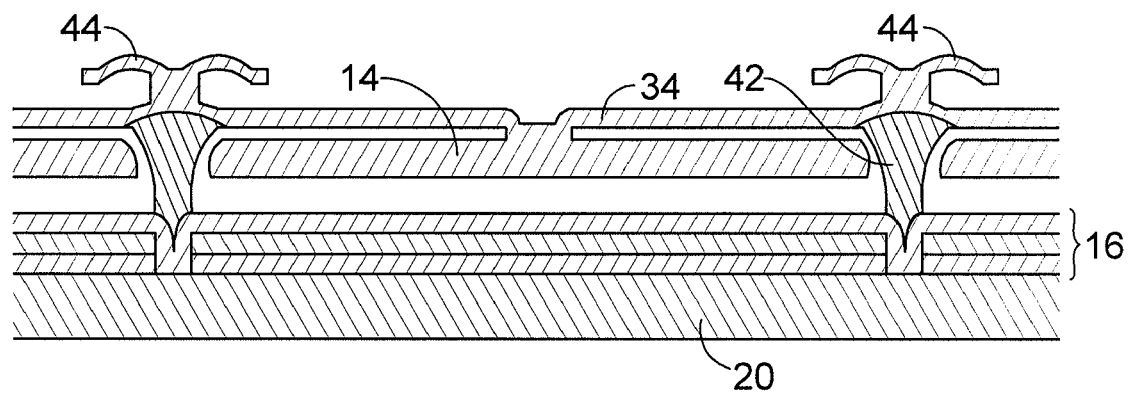
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the movable reflective layer 14 of each interferometric modulator is square or rectangular in shape and attached to supports at the corners only, on tethers 32. In FIG. 7C, the movable reflective layer 14 is square or rectangular in shape and suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. For example, such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Figure 8A:
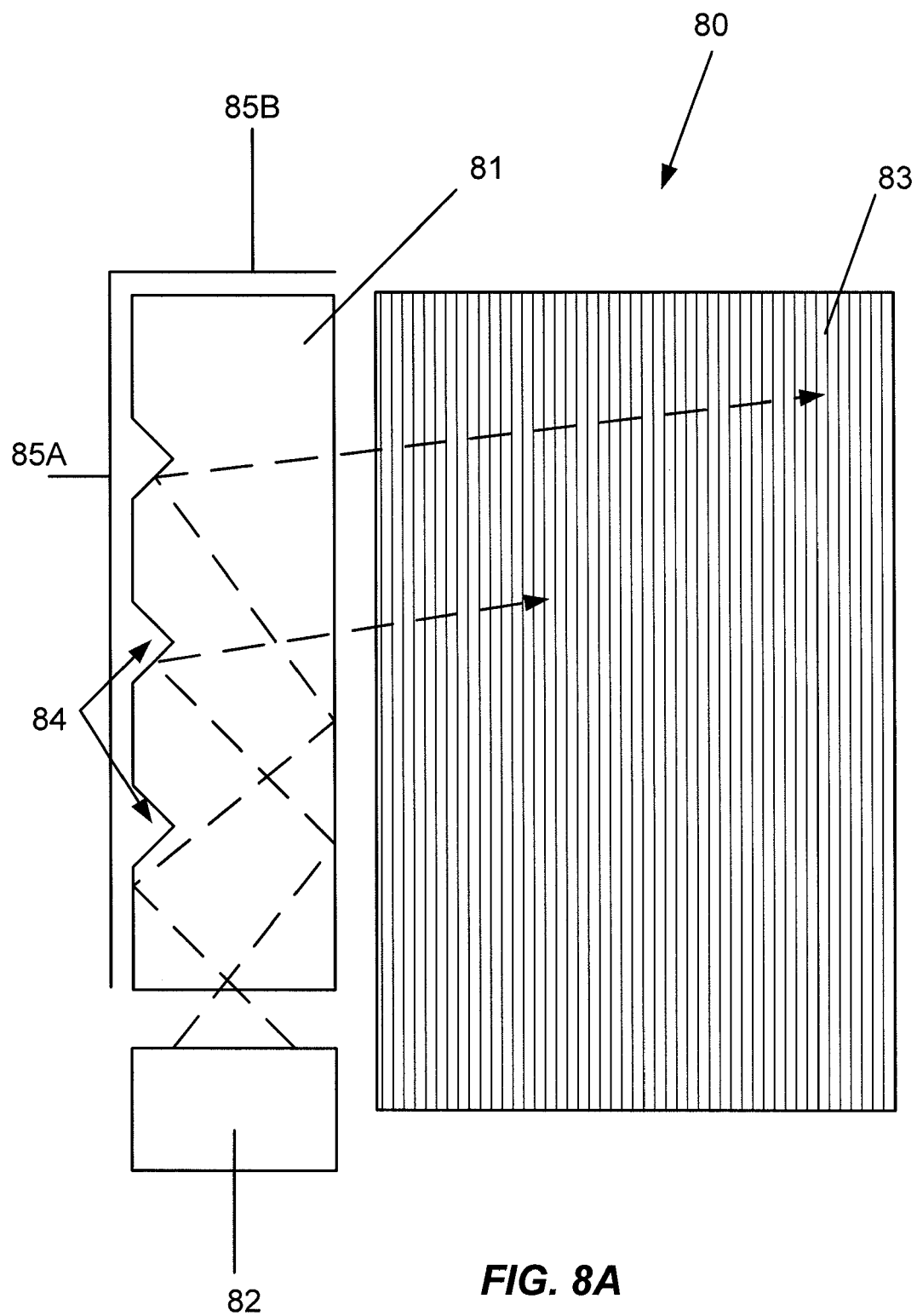
FIG. 8A is a top view of a display device comprising a light source, a light bar reflector, and a light guide panel that can illuminate an array of interferometric modulators.

As described above, the interferometric modulators are reflective display elements and can rely on ambient lighting in daylight or well-lit environments. In addition, an internal source of illumination can be provided for illuminating these reflective display elements in dark ambient environments. The illumination for reflective displays may be provided by a front illuminator. FIG. 8A shows the top view of a portion of a display device 80 comprising an illumination apparatus configured to provide front illumination. According to one embodiment, the display device 80 comprises a light source 82, a light bar 81 and a light guide panel 83. The light source 82 in this particular embodiment comprises an LED. The light source 82 may comprise an incandescent bulb, multiple light emitting diodes, a fluorescent lamp, or another light source. In some embodiments, the light bar 81 is disposed with respect to the light source 82 to receive light therefrom. Reflective sections 85A and 85B are disposed with respect to the side and end of the light bar 81, respectively, and are configured with a reflective surface disposed towards the light bar 81. Light that leaves the light bar 81 and is incident on the reflective sections 85A and 85B is reflected back towards the light bar 81 such that at least a portion of the reflected light enters the light bar and propagates to the light guide panel 83. Reflectors may also be included above and/or below the light bar 81. The light bar 81 comprises substantially optically transmissive material that supports propagation of light along the length thereof. Light emitted from the light emitter 82 propagates into the light bar 81 and is guided therein, for example, via total internal reflection at sidewalls of the light bar, which form interfaces with air or some other surrounding medium. The light bar 81 includes turning microstructure 84 on at least one side, here being disposed opposite the light guide panel 83. The turning microstructure 84 is configured to turn a substantial portion of the light incident on that side of the light bar 81 and to direct a portion of this light out of the light bar 81 into the light guide panel 83. In certain embodiments, the illumination apparatus may further comprise a coupling optic (not shown) between the light bar 81 and the light guide panel 83. For example, the coupling optic may collimate light propagating from the light bar 81. Other configurations are also possible.

The light guide panel 83 is disposed with respect to the light bar 81 so as to receive light that has been turned by the turning microstructure 84 and directed out of the light bar 81. In certain embodiments, for example, the light guide panel 83 may comprise a sheet or plate having a prismatic film thereon that reflects light from the light bar 81 onto a plurality of display elements (not shown) beneath the light guide panel in FIG. 8A. The plurality of display elements may comprise, for example, a plurality of spatial light modulators (e.g. interferometric modulators, or liquid crystal elements).

To reduce the footprint of display device, in certain embodiments the light bar 81 which is disposed adjacent to one edge of the light guide panel 83 in FIG. 8A may be replaced with another smaller optical coupling element, for example, a turning mirror. Removing the light bar 81 from the side of the light guide panel 83 reduces the footprint by reducing the dimension of the display device in the X-Y plane. Moreover, the light bar 81 need not be included thereby reducing device complexity and possible cost. Such a configuration may also allow the light source 82 to be positioned behind the plurality of display elements possibly further reducing the footprint. Such designs may be useful in addressing the size or form factor restrictions or other considerations. Various approaches described herein may therefore use a light source behind the display elements and a turning mirror to front illuminate a reflective display element.

Figure 8B:
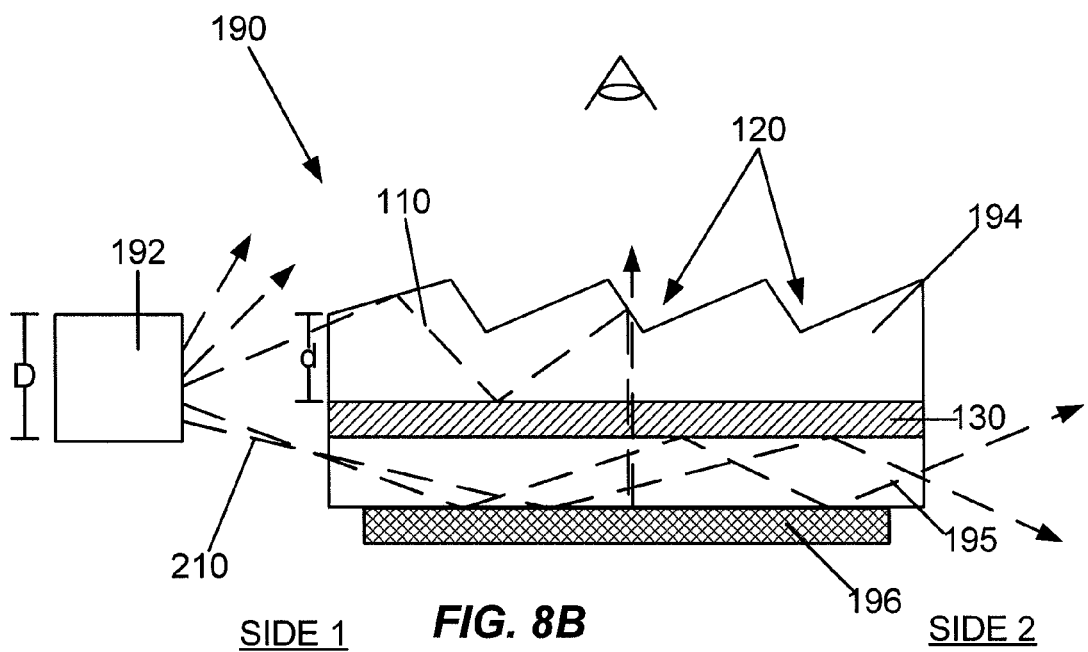
FIG. 8B is a side view schematically illustrating an embodiment of a display device with asymmetric turning features for turning light.

Turning now to FIG. 8B, a side view of display device 190 with a front light design containing multiple components is schematically depicted. In one embodiment, these components can include a first light guide or turning film 194, a second light guide 195, a diffuser layer 130 disposed between the first light guide and the second light guide, a plurality of reflective elements 196 positioned such that the second light guide is disposed between the plurality of reflective elements and the diffuser, and a light source 192 configured to input light into at least one edge or surface of both the first light guide and the second light guide. The light source 192 may comprise any suitable light source, for example, fluorescent lamps, incandescent bulbs, a light bar, a light emitting diode (LED), an LED light bar, and/or an array of LEDs. In some embodiments, the light source 192 has a dimension D that is greater than the thickness d of the first light guide. This allows the light guide to provide light into both the first and second light guides 194, 195.

The diffuser layer 130 may comprise material with a refractive index that is lower than the first and second light guides 194, 195. By using a low refractive index diffuser, light propagates within the first light guide 194 and is guided to stay within the first light guide 194 unless the angle of incidence of light on the diffuser 130 is sufficiently normal to enter the diffuser 130 and propagate towards the reflective elements 196. This can occur when light in the first light guide 194 reflects from light turning features 120. The refractive index of the second light guide 195 can also be larger than that of the diffuser 130, such that guiding can also occur for light 210 injected emitted into the second light guide 194. For example, in one embodiment, the refractive index (n) of the first light guide, diffuser, and second light guide can be 1.58, 1.47, and 1.53 respectively.

In some embodiments, the plurality of reflective elements 196 may comprise one or more interferometric modulators, MEMS devices, reflective spatial light modulators, electromechanical devices, liquid crystal structures, and/or any other suitable reflective display. The diffuser 130 schematically depicted in FIG. 8B can be a low index pressure-sensitive adhesive ("PSA"). In some embodiments, it may be convenient to use a PSA to laminate the first light guide 194 to the second light guide 195. The lower refractive index of the diffuser 130 enables total internal reflection ("TIR") through the first light guide causing light to be guided in the first light guide without being diffused by the diffuser film. In some embodiments, the diffuser 130 may be disposed be as close to the display 196 as possible to facilitate optical performance (reduction of image blurring).

In some embodiments, the first and second light guides 194, 195 may comprise any substantially optically transmissive material that supports propagation of light along the length thereof. For example, in some embodiments, the first and second light guides can comprise acrylic, glass, polyethylene terephthalate (PET), a polycarbonate film with a high index diffuser interface, or PET-G. The first and second light guides 194, 195 may have varying thicknesses. Some characteristics that may be affected by the thickness of the first and second light guides 194, 195 include the uniformity of brightness across the display device 190 and the efficiency of the display device. In one embodiment, the efficiency of a display device may be determined by comparing the amount of light provided by the light source 192 with the amount of light reflected off of the reflective display elements 196.

In some embodiments, the first light guide 194 may include one or more asymmetric turning features 120. In one embodiment, an asymmetric turning feature 120 has at least one steep facet and at least one shallow facet. In some embodiments, the turning features 120 may comprise a plurality of asymmetric microprisms extending along the length of the first light guide 194. The microprisms may be configured to receive light propagating along the length of the first light guide 194 and turn the light through a large angle, usually between about 70-90° with a plurality of grazing incidence reflections. The prismatic microstructures may comprise two or more turning facets angled with respect to one another for reflecting the light at the air/facet interface via total internal reflection and causing the light to be turned toward the array of display elements 196 at near normal incidence or close thereto.

In other embodiments, the turning features 120 may comprise any suitable asymmetric feature, for example, light extraction dots, grooves, diffractive gratings, holograms, or similar features. For example, in one embodiment, the asymmetric turning features 120 may comprise one or more diffractive optical elements or holograms (e.g., volume or surface holograms or grating) configured to receive light normally guided in the first light guide 194 and turn the light such that the light is redirected towards the display elements 196. In certain embodiments, the propagation direction of the turned light forms an angle smaller than 45 degrees from the normal to the display elements 196. In some embodiments the turning features 120 may be etched into a substrate layer to form a first light guide 194. In other embodiments, a running film comprising turning features 120 formed therein may be laminated onto a substrate to form a first light guide 194. In embodiments where the first light guide 194 comprises multiple layers, the refractive indices of the different layers may be close so that light is transmitted through the various layers without being substantially reflected or refracted.

Still referring to FIG. 8B, in one embodiment, light 110 emitted from the light source 192 may enter the first light guide 194 along one or more edges or surfaces at the first side (labeled as "Side 1") of the display device 190. Light 110 propagating in the first light guide 194 at shallow angles (e.g., not near-perpendicular to the diffuser 130) is bound by TIR and does not penetrate the diffuser 130. Light 110 propagating within the first light guide 110 may also encounter one or more turning features 120 and be turned at a perpendicular or near-perpendicular angle towards the diffuser 130 allowing the light 110 to break TIR and pass through the diffuser 130 towards the display elements 196. To maximize the brightness and efficiency of the display 190, light should be transmitted to the reflective display elements 196 at normal incidence or close thereto. Light 110 that does not encounter one or more turning features 120 may continue to propagate through the first light guide 194 at shallow angles towards the second side of the display device. Light 110 that is not directed through the diffuser 130 may be emitted from the first light guide 194 along one or more edges at the second side (labeled as "Side 2") of the display device 190.

In some embodiments, light 210 from the light source 192 may enter the second light guide 195 in addition to the light 110 that enters the first light guide 194. The light 210 may enter the second light guide along one or more edges or surfaces at the first side of the display device 190. Light 210 propagating in the second light guide 195 at shallow angles (e.g., not perpendicular to the diffuser 130 or reflective display elements 196) is bound by TIR within the second light guide 195. Light 210 that encounters the diffuser 130 or the reflective display elements 196 at near-perpendicular angles may break TIR and pass through to the diffuser or display elements. Light 210 that propagates through the second light guide 195 from the first side of the display device 190 to the second side may be emitted from the second light guide along one or more edges at the second side.

In certain embodiments, the reflective display 196 may be absorptive to light rays 210 travelling at an angle of 45-90 degrees measured from the normal to the reflective display that are guided within the second light guide 195. Thus, some of the light guided through the second light guide 195 may be substantially absorbed by the reflective display 196 after a sufficient number of internal reflections.

Figure 9A:
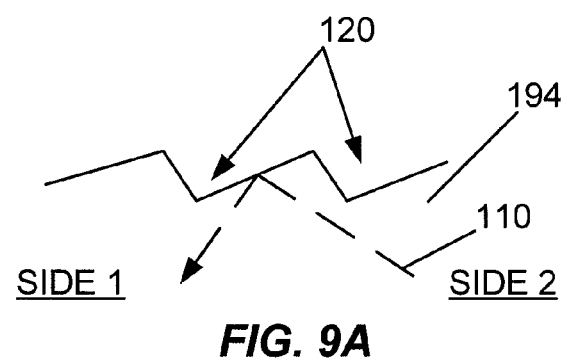
FIG. 9A is a side view schematically illustrating light propagating through an embodiment of a display device with asymmetric turning features.

As can be appreciated by one having ordinary skill in the art, there are several inefficiencies resulting from the geometry schematically depicted in FIG. 8B. A first problem with the geometry schematically depicted in FIG. 8B is illustrated closer in FIG. 9A, which shows light 110 propagating within a first light guide 194 from the second side to the first side of the light guide. As depicted in FIG. 9A, light 110 cannot be turned by asymmetric turning features 120 at large angles from both directions. As a result, light 110 propagating from the second side to the first side cannot be turned away from the turning features 120 towards a display. Stated differently, light 110 may not be recycled within the first light guide 194 because it can only be turned towards a display or other object when propagating in one direction.

Another problem with the display device 190 depicted in FIG. 8B is that the light source 192 has a thickness hat is larger than the first light guide 194 thickness. For example, in one embodiment, on Side 1 of FIG. 8B, the first light guide 194 has a thickness d (e.g., ≈0.3 mm), whereas light source 192 has a larger thickness of D (e.g., ≈0.5 mm). As a result, the light source 192 exit aperture overfills the first light guide edge such that some of the light emitted by the light source does not enter the first light guide 194 resulting in a waste or loss of light. This loss will become more pronounced, for example, as the relative size of the light source 192 becomes larger with respect to the size of the first light guide 194.

A third problem with the geometry in FIG. 8B is that it is hard to get light 110 entering the first light guide from the light source 192 (Side 1) all the way to the far end of the first light guide (Side 2). As a result, the end of the first light guide 194 and the reflective display 196 on Side 2 may be (relatively) dim in appearance.

Figure 9B:
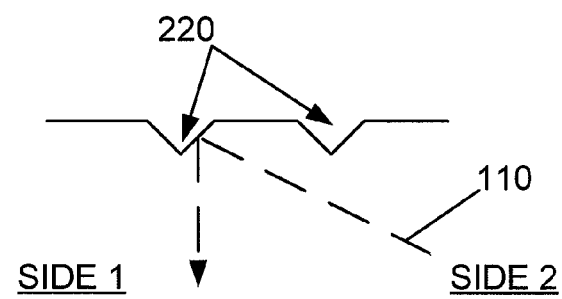
FIG. 9B is a side view schematically illustrating light propagating through an embodiment of a display device with symmetric turning features.

FIG. 9A illustrates some embodiments of turning features that may be included in the display device illustrated in FIG. 8B. Light 110 propagating from Side 2 to Side 1 is turned by asymmetric turning features. Because of the geometry of asymmetric turning features 120, light 210 is not able to turn at large angles (e.g., near perpendicular) in order to penetrate through a diffuser film 130. However, if the asymmetric facet-shaped turning features 120 shown in FIG. 9A are replaced by one or more symmetric facet-shaped turning features 220 as schematically depicted in FIG. 9B, light from opposite directions (e.g., both directions), can be turned at a large angle towards one or more directions, for example, a reflective display. Accordingly, in some embodiments the light 110 is provided and turned from two or more directions. FIG. 9B shows light 110 turned at a large enough angle to penetrate through the diffuser film 130 depicted in FIG. 8B.

Figure 10:
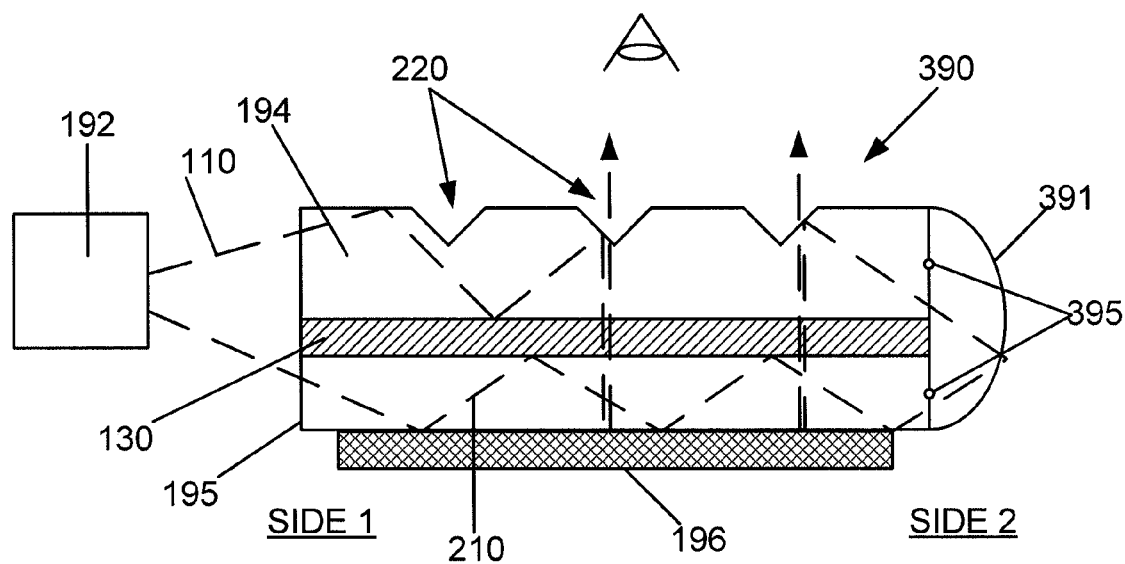
FIG. 10 is a side view schematically illustrating an embodiment of a display device incorporating a reflector and symmetric turning features for turning light.

Turning now to FIG. 10, a display device 390 with a reflector (or turning mirror) 391 and symmetric turning features 220 is schematically depicted according to one embodiment. The symmetric turning features 220 are configured to turn light 110 and light 210 through the diffuser 130 and second light guide 195 to illuminate a reflective display 196. As discussed above, symmetric turning features 220 may be used to turn light propagating in more than one direction at large angles. The reflector 391 may be placed at or near the second side (Side 2) of the display device 390 to receive light that is emitted from the second light guide 195 and redirect this light into the second side of the first light guide 194. The reflector 391 may also receive light that is emitted from the first light guide 194 and redirect this light into the second side ("Side 2") of the second light guide 195.

Additionally, in some embodiments, a reflector 391 may be positioned near more than one side of the display device 390 to redirect light between the light guides 194, 195 at multiple locations. The reflector 391 may comprise any reflective material. For example, in some embodiments, the reflector 391 may comprise metal. In another embodiment, the reflector 391 may comprise a reflective dielectric stack.

Figure 11:
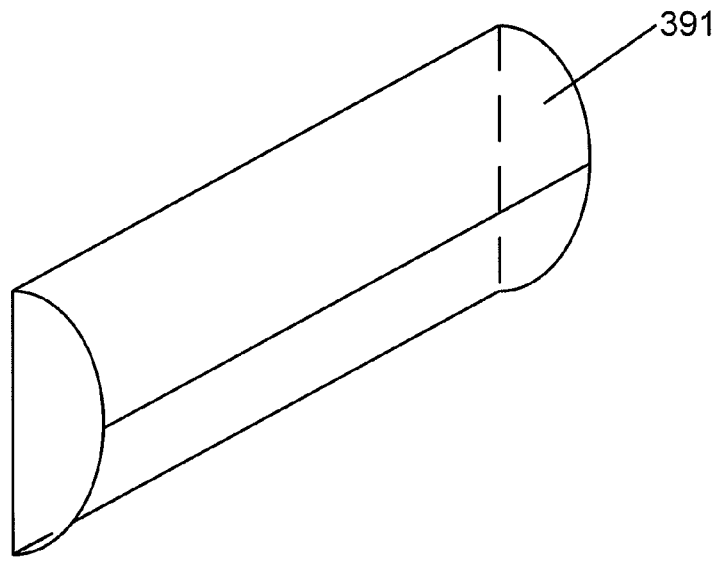
FIG. 11 is a perspective view schematically illustrating the reflector depicted in FIG. 10.

As depicted in FIGS. 10 and 11, in some embodiments, the reflector 391 may comprise a curved reflector. However, in other embodiments, various differently shaped reflectors may be used to redirect light from the second light guide 195 to the first light guide 194 or from the first light guide to the second light guide. For example, in some embodiments, the reflector 391 may be curvilinear, planar, or polygonal. In embodiments with a curved reflector 391, the curved cross-section of the reflector 391 may be circular, elliptical, other conics, or aspheric. The curved cross-section may be smooth or faceted. The facets can be planar or non-planar. The curved surface may be multifaceted comprising, for example, three, four, five, ten, or more facets. In shown in FIG. 10, the cross section of the surface of the reflector 391 is elliptical. The reflector 391 has an optical aperture that overlaps both the edge of the first light guide 194 and the edge of the second light guide 195 in its optical path. In the embodiment shown, the aperture is larger than the thicker of the first and second light guides 194, 195. In particular, the aperture is as large as the first and second light guides 194, 195 and diffuser 130. The height of the turning mirror or reflector 391 may be between about 0.5 and 2.0 mm. In other embodiments, the height of the reflector 391 may be between about 0.25 and 1.0 mm. In some embodiments, the reflector may have a width from about 0.25 to 1 or to 3 or 4 mm. The reflector 391 can have other shapes and sizes.

In some embodiments, and as shown in FIG. 10, the elliptical cross section of the reflector 391 has two line foci 395. The foci 395 are disposed in the middle of the first light guide 194 and the middle of the second light guide 195. If the light 210 that emerges from the edges of the second light guide 195 passes through the first focus 395, the light 210 will, after reflecting from the reflector 391, pass through the second focus 395 and be injected into the first light guide 195 with good efficiency, e.g. greater than 50%. The light distribution as the edge of the second light guide 195 towards Side 2 will be imaged at the edge of the first light guide 194 towards Side 2. Other configurations of the position of foci are possible. For example, the foci 395 do not need to be disposed precisely at the center or edge of the first and second light guides 194, 195.

Light is coupled from the second light guide 195 into the first light guide 194 by the reflector 391. For example, light from light source 192 can be coupled into the second light guide 195 at Side 1. The light propagates within the second light guide 195 from the input edge Side 1 to the output edge Side 2 by TIR. The light rays 210 that are incident on the reflector 391 are reflected by the reflector 391 into the first light guide 194. The turning features 220 turn light guided in the first light guide 194 such that the light is redirected towards the reflective display 196. The redirected light passes through the diffuser 130 and the second light guide 195 substantially normal to the first light guide 194 and is transmitted to the reflective display 196 preferably at normal incidence or close thereto.

In some embodiments, light source 192 can be positioned relative to the first and second light guides 194, 195 such that half of the light emitted from the light source enters the first light guide 194 and half enters the second light guide 195. In other embodiments, the light source 192 may be positioned such that a different percentage of light from the light source enters the first and second light guide 194, 195. In one embodiment, the light source 192 emits a greater percentage of light into the second light guide 195 which can provide more light to the turning features 220 closer to Side 2, resulting in better illumination of the reflective display 196 near Side 2.

In another embodiment the reflective surface of the reflector may have a parabolic cross-section. In case of the parabolic reflector, the light passing through a line focus of the parabolic reflecting surface will emerge in a direction perpendicular to a directrix of the parabola after reflection. In those embodiments having a parabolic reflector, the size and shape of the parabolic reflecting surface can be adjusted to increase or maximize the efficiency of coupling light from the second light guide 195 to the first light guide 195.

In some embodiments, the reflector can be solid as compared to a hollow shell. The reflector, for example, may comprise a rod of substantially optically transmissive material such as glass or plastic. In some embodiments, the reflector may be hollowed out and comprise, for example, a shell having two curved surfaces. One of the curved surfaces may be reflective. In one embodiment, for example, where the turning mirror comprises optically transmissive material such as plastic, one of the curved surfaces may be metallized or have a dielectric or interference coating formed thereon. In other embodiments, the turning mirror may comprise metal with one of the curved surfaces being polished to increase reflectivity.

Figure 12:
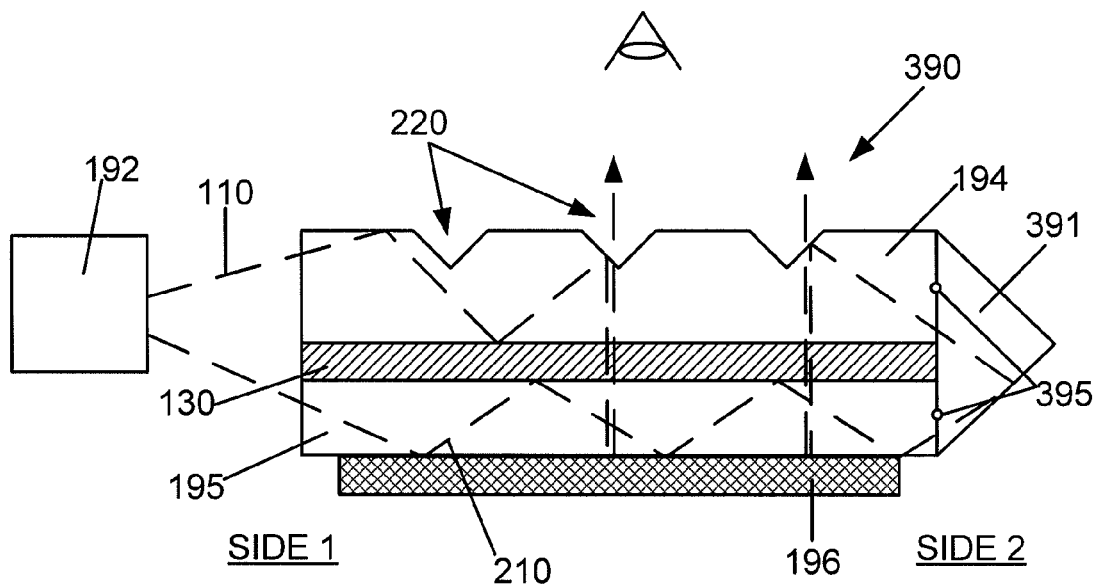
FIG. 12 is a side view schematically illustrating an embodiment of a display device incorporating a reflector and symmetric turning features for turning light.
Figure 13:
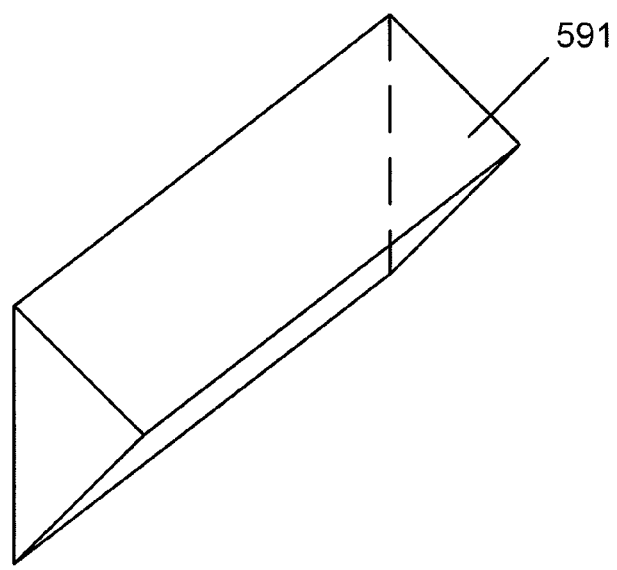
FIG. 13 is a perspective view schematically illustrating the reflector depicted in FIG. 12.

In certain embodiments, the reflector 391 may comprise multiple planar reflecting surfaces disposed at an angle with respect to each other. The particular embodiment illustrated in FIGS. 12 and 13, for example, shows two reflecting planar surfaces angled with respect to each other. The angle between the two planar surfaces can vary between, for example, 90 and 120 degrees or between 90 and 100 degrees or between 90 and 110 degrees. In certain embodiments, the planar mirror surfaces are oriented at an angle of 90, 95, 100, 105, 110, 115 or 120 degrees with respect to each other. Examples include 97 and 117 degrees. The angles are not limited to those of these particular examples or ranges. The reflector 391 illustrated in FIG. 12 may comprise a solid rod or be it may be hollowed out as described above. The reflector may comprise optically transmissive material such as glass, plastic. In other embodiments, the mirror may be metal. In some other embodiments, the reflecting surface can comprise a metal film or a dielectric film. In some embodiments the reflecting film comprises an interference coating. The two reflecting surfaces can be fused, adhered, or affixed together. In some embodiments, for example, the mirror may be formed by extruding or molding an elongate structure with the planar surfaces thereon. Other methods of forming the two reflecting surfaces may be used.

Figure 14:
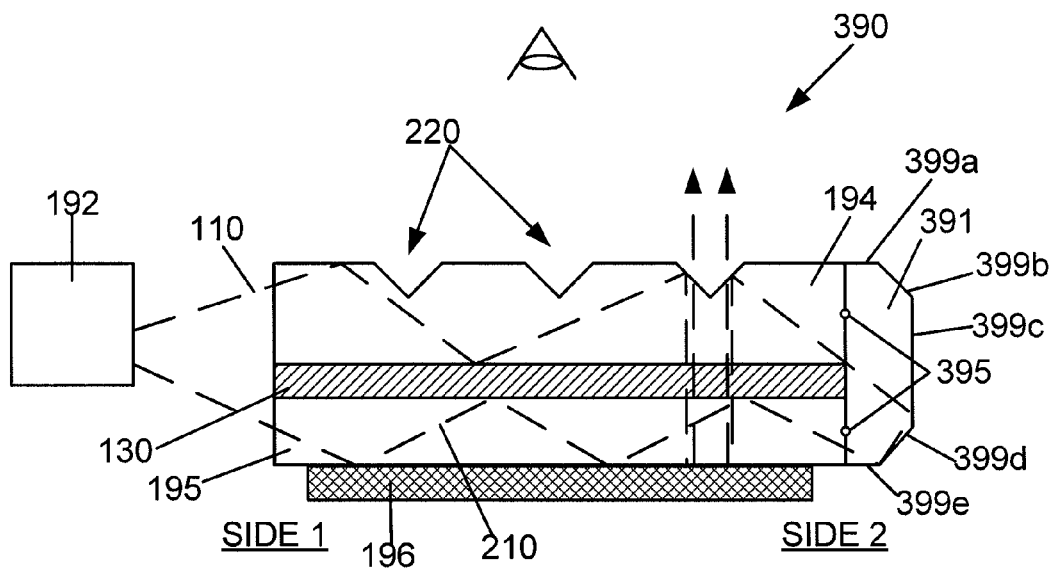
FIG. 14 is a side view schematically illustrating an embodiment of a display device incorporating a reflector and symmetric turning features for turning light.
Figure 15:
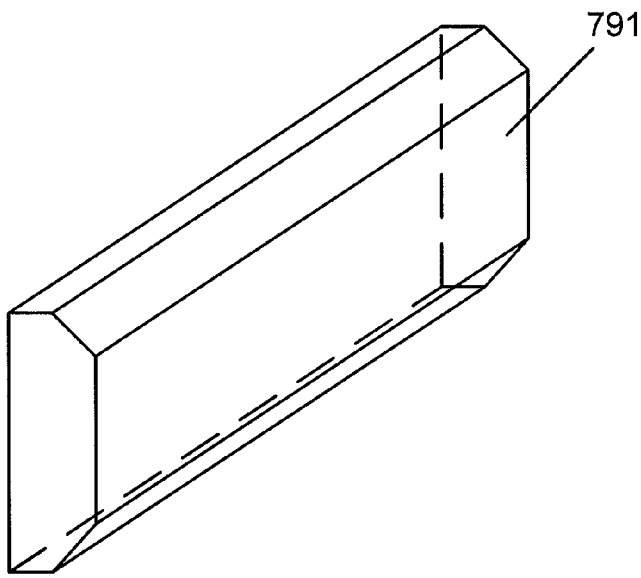
FIG. 15 is a perspective view schematically illustrating the reflector depicted in FIG. 14.

The embodiment depicted in FIGS. 14 and 15 shows multiple reflecting planar surfaces 399a-399e angled with respect to each other. The angle between the reflecting planar surfaces can very. In some embodiments, the reflecting planar surfaces can be disposed in a generally polygonal shape, for example, half of an octagon. In other embodiments, the reflector 391 may have a cross-section in the shape of a trapezoid formed by three reflecting surfaces.

A display device with a reflector provides multiple benefits. For example, a display device incorporating a reflector may save light that otherwise would be lost due to aperture overfilling (e.g., as shown in Side 1 of FIG. 8B). A display device incorporating a reflector may also enable the reduction or increase in front light thickness. Also, a display device incorporating a reflector may provide more light to otherwise dimly lit portions of the display (e.g., Side 2 of FIG. 8B) and increase the overall brightness of a display.

In operation, light from the light source 192 is coupled into the second light guide 195. The light 210 propagates within the second light guide 195 from the input edge Side 1 to the output edge Side 2 by TIR. The light rays 210 from the second light guide 195 are incident on the reflector 391. After being redirected by the reflector 391, the light rays are incident on the first light guide 194 on Side 2. The first light guide 194 includes a plurality of symmetric turning features 220 that are configured to turn light travelling within the first light guide 194 towards the reflective display 196. By incorporating symmetric turning features 220 instead of asymmetric turning features, both light 110 and light 210 can be turned at a large enough angle to penetrate through the diffuser 130 and illuminate the reflective display 196. The turned light 110, 210 passes through the first light guide 194, the diffuser 130, and the second light guide 195 before transmitting to the reflective display 196 at substantially normal incidence, or close thereto.

Figure 16:
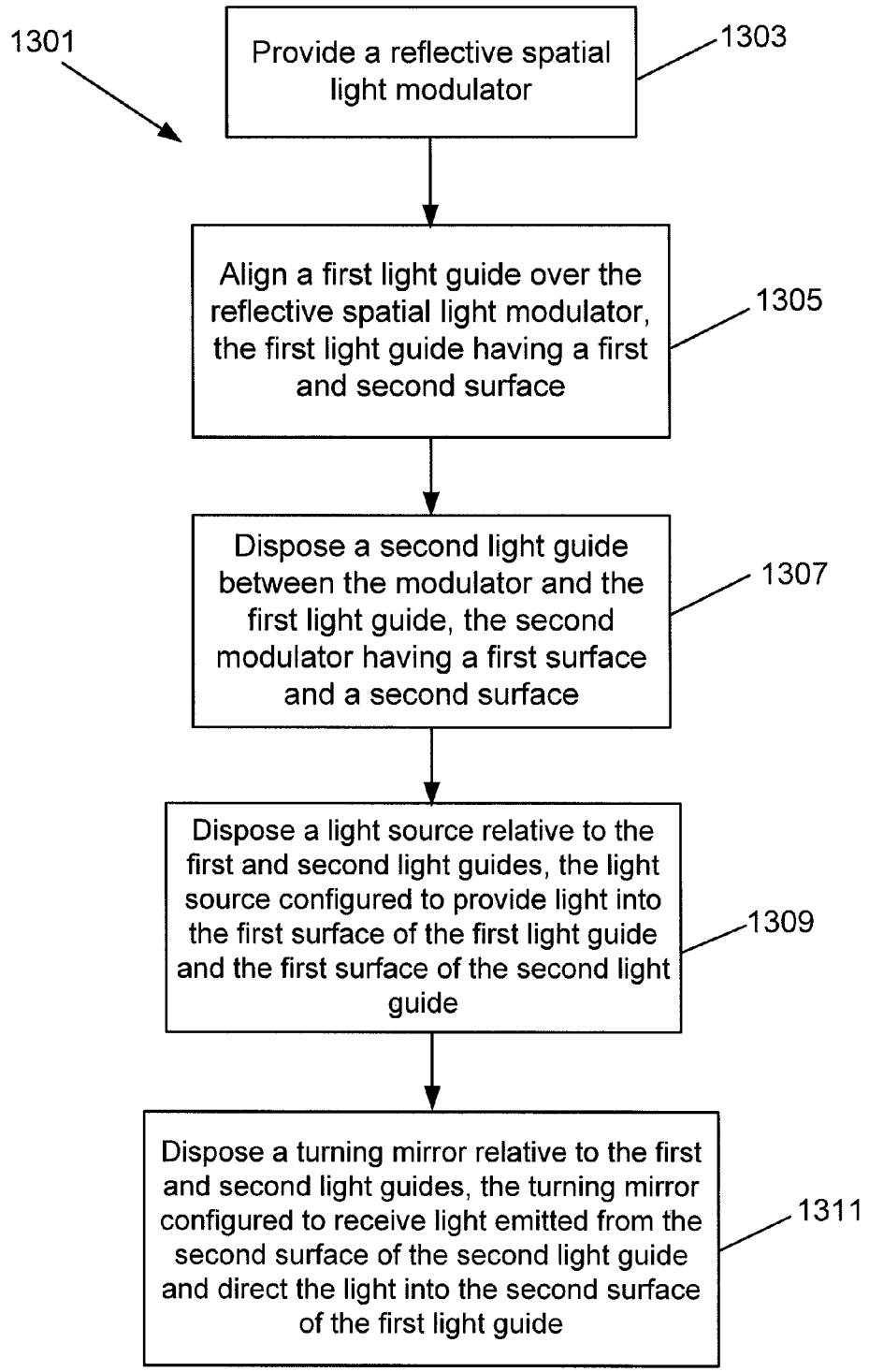
FIG. 16 is a top view schematically illustrating an embodiment of a display device incorporating a turning mirror having two planar reflective surfaces angled with respect to each other.

FIG. 16 is a block diagram depicting an embodiment of a method 1301 of manufacturing a display device. Method 1301 includes the steps of providing a reflective spatial light modulator 1303, aligning a first light guide over the reflective spatial light modulator, the first light guide having a first and second surface 1305, disposing a second light guide between the modulator and the first light guide, the second light modulator having a first surface and a second surface 1307, disposing a light source relative to the first and second light guides, the light source configured to provide light into the first surface of the second light guide 1309, and disposing a turning mirror relative to the first and second light guides, the turning mirror configured to receive light emitted from the second surface of the second light guide and direct the light into the second surface of the first light guide 1311. In another embodiment, method 1301 may also include the step of disposing a diffuser layer between the first light guide and the second light guide.

A wide variety of other variations are also possible. Films, layers, components, and/or elements may be added, removed, or rearranged. Additionally, processing steps may be added, removed, or reordered. Also, although the terms light guide, diffuser, and reflective display have been used herein, such terms as used herein include stacks and multilayers. Such stacks and multilayers may be adhered to other structures using adhesive or may be formed on other structures using deposition or in other manners.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The invention claimed is:

1. A display device comprising:
    a reflective spatial light modulator;
    a first light guide aligned over said modulator, said first light guide comprising a top surface disposed distal to said modulator and a bottom surface disposed proximate to said modulator, said first light guide further comprising a first end surface and a second end surface;
    a second light guide disposed between said modulator and said first light guide, said second light guide comprising a top surface disposed distal to said modulator and a bottom surface disposed proximate to said modulator, said second light guide further comprising a first end surface and a second end surface;
    a light source in optical communication with said first light guide and said second light guide, said light source configured to provide light through the first end surface of said first light guide and through the first end surface of said second light guide; and
    a turning mirror disposed to receive light emitted from said second light guide second end surface and direct said light to the second end surface of said first light guide,
    said first light guide further comprising turning features configured to direct light that enters said first light guide first end surface and light that enters said first light guide second end surface through the bottom surface of said first light guide to said modulator.

2. The display device of claim 1, wherein said reflective spatial light modulator comprises an electromechanical system.

3. The display device of claim 1, wherein said reflective spatial light modulator comprises a plurality of interferometric modulators.

4. The display device of claim 3, wherein each interferometric modulator comprises:
a movable reflective layer;
a fixed reflective layer; and
an optical resonant gap defined by said movable reflective layer and said fixed reflective layer.

5. The display device of claim 1, wherein said light source comprises a light emitting diode.

6. The display device of claim 1, wherein said light source comprises a light bar.

7. The display device of claim 1, wherein said second light guide comprises a film stack.

8. The display device of claim 1, further comprising a diffuser layer between said first light guide and said second light guide.

9. The display device of claim 1, wherein said turning features comprise a reflective, refractive, holographic or diffractive optical element.

10. The display device of claim 1, wherein said turning features comprise grooves.

11. The display device of claim 1, wherein said turning features comprise symmetric features configured to turn light propagating in two directions in the first light guide to said reflective spatial light modulator.

12. The display device of claim 1, wherein said turning mirror comprises a curved reflective surface.

13. The display device of claim 12, wherein said curved reflective surface is elliptical.

14. The display device of claim 13, wherein said elliptical surface has foci proximal to ends of said first and second light guides.

15. The display device of claim 1, wherein said turning mirror comprises at least two planar surfaces forming an angle therebetween.

16. The display device of claim 15, wherein said angle is between about 90 and about 120 degrees.

17. The display device of claim 15, wherein said angle is about 90 degrees.

18. The display device of claim 15, wherein said angle is about 120 degrees.

19. The display device of claim 1, wherein said turning mirror comprises a metalized surface.

20. The display device of claim 1, wherein said turning mirror comprises a reflective dielectric stack.

21. The display device of claim 1, further comprising:
a processor that is configured to communicate with said spatial light modulator, said processor being configured to process image data; and
a memory device that is configured to communicate with said processor.

22. The display device of claim 21, further comprising a driver circuit configured to send at least one signal to said spatial light modulator.

23. The display device of claim 22, further comprising a controller configured to send at least a portion of the image data to said driver circuit.

24. The display device of claim 21, further comprising an image source module configured to send said image data to said processor.

25. The display device of claim 24, wherein the image source module comprises at least one of a receiver, transceiver, and transmitter.

26. The display device of claim 21, further comprising an input device configured to receive input data and to communicate said input data to said processor.

27. A display device comprising:
a first light guide comprising a front and back surface and edge surfaces, said first light guide configured to receive light through two or more edge surfaces, and direct said received light towards said back surface;
a second light guide comprising a front and back surface and edge surfaces, said front surface of said second light guide disposed under said back surface of said first light guide, said second light guide configured to receive light through one or more edge surfaces and emit light through at least one edge surface;
a turning mirror disposed to receive light emitted from said second light guide, and direct said light into at least one edge surface of said first light guide; and
a reflective spatial light modulator disposed such that the second light guide is between said first light guide and said reflective spatial light modulator.

28. The display device of claim 27, wherein said reflective spatial light modulator comprises an electromechanical system.

29. The display device of claim 27, wherein said reflective spatial light modulator comprises a plurality of interferometric modulators.

30. A method of manufacturing a display device comprising:
providing a reflective spatial light modulator;
aligning a first light guide over said reflective spatial light modulator, said first light guide having a first surface and a second surface;
disposing a second light guide between said modulator and said first light guide, said second light guide having a first surface and a second surface;
disposing a light source relative to said first and second light guides, said light source configured to provide light into said first surface of said first light guide and said first surface of said second light guide; and
disposing a turning mirror relative to said first and second light guides, said turning mirror configured to receive light emitted from said second surface of said second light guide and direct said light into said second surface of said first light guide.

31. The method of claim 30, further comprising disposing a diffuser layer between said first light guide and said second light guide.

32. A display device comprising:
reflective display means;
a first light guide comprising a front and back surface and edge surfaces, said first light guide configured to receive light through two or more edge surfaces, and direct said received light towards said back surface; a second light guide comprising a front and back surface and edge surfaces, said front surface of said second light guide disposed under said back surface of said first light guide, said second light guide configured to receive light through one or more edge surfaces and emit light through at least one edge surface; lighting means for providing light through the first end surface of said first light guide and through the first end surface of said second light guide; and light turning means for receiving light emitted from said second light guide and directing said light into at least one edge surface of said first light guide, wherein said first light guide is configured to direct light propagating therein to said reflective display means.

33. The display device of claim 32, wherein the reflective display means comprises a reflective interferometric modulator.

34. The display device of claim 32, wherein the first light guide comprises a first light guide aligned over said reflective display means, said first light guide comprising a top surface disposed distal to said reflective display means and a bottom surface disposed proximate to said reflective display means, said first light guide further comprising a first end surface and a second end surface.

35. The display device of claim 32, wherein the second light guide comprises a second light guide disposed between said reflective display means and said first light guide, said second light guide comprising a top surface disposed distal to said reflective display means and a bottom surface disposed proximate to said reflective display means, said second light guide further comprising a first end surface and a second end surface.

\* \* \* \* \*